United States Patent
Avatara

(10) Patent No.: US 9,245,262 B1
(45) Date of Patent: Jan. 26, 2016

(54) SYSTEMS AND METHODS FOR BOOKMARK PAYMENT PROCESSING

(71) Applicant: JPMorgan Chase Bank, N.A., New York, NY (US)

(72) Inventor: Satyan Avatara, Landenberg, PA (US)

(73) Assignee: JPMORGAN CHASE BANK, N.A., New York, NY (US)

(*) Notice: Subject to any disclaimer, the term of this patent is extended or adjusted under 35 U.S.C. 154(b) by 119 days.

(21) Appl. No.: 14/051,028

(22) Filed: Oct. 10, 2013

Related U.S. Application Data

(60) Provisional application No. 61/866,249, filed on Aug. 15, 2013.

(51) Int. Cl.
| | |
|---|---|
| *G06Q 40/00* | (2012.01) |
| *G06Q 20/10* | (2012.01) |
| *G06Q 20/40* | (2012.01) |
| *G06Q 20/04* | (2012.01) |
| *G06F 17/00* | (2006.01) |
| *G06Q 30/02* | (2012.01) |

(52) U.S. Cl.
CPC ............ *G06Q 20/10* (2013.01); *G06F 17/00* (2013.01); *G06Q 20/04* (2013.01); *G06Q 20/102* (2013.01); *G06Q 20/40* (2013.01); *G06Q 30/0222* (2013.01)

(58) Field of Classification Search
USPC ............... 705/35, 36, 37, 39, 38, 26, 40, 21; 235/383; 345/723, 716; 386/69, 70; 455/466; 709/203, 246; 707/7, 10, 200, 707/512; 715/206
See application file for complete search history.

(56) References Cited

U.S. PATENT DOCUMENTS

| | | | | |
|---|---|---|---|---|
| 2002/0163532 | A1* | 11/2002 | Thomas | G06F 17/30814 715/723 |
| 2003/0046290 | A1* | 3/2003 | Yamada | G06F 17/30884 |
| 2003/0188263 | A1* | 10/2003 | Bates | G06F 17/30884 715/206 |
| 2004/0048603 | A1* | 3/2004 | Corneliussen | H04L 67/04 455/414.1 |
| 2007/0043745 | A1* | 2/2007 | Rojer | G06F 17/30884 |
| 2007/0078903 | A1* | 4/2007 | Saito | G06F 17/30884 |
| 2007/0192206 | A1* | 8/2007 | Manesh | G06Q 30/02 705/26.35 |
| 2007/0244903 | A1* | 10/2007 | Ratliff | G06F 17/30038 |
| 2008/0250023 | A1* | 10/2008 | Baker et al. | 707/10 |
| 2008/0263049 | A1* | 10/2008 | Hind | G06F 17/30884 |
| 2008/0288492 | A1* | 11/2008 | Gemmell | G06F 17/30884 |
| 2008/0320168 | A1* | 12/2008 | Da Palma | G06F 9/44505 709/246 |

(Continued)

OTHER PUBLICATIONS

Tauscher, L. et al.; "How people revisit web pages: empirical findings and implications for the design of history systems"; Int. J. Human-Computer Studies; vol. 47; 1997; pp. 97-137.*

(Continued)

*Primary Examiner* — Tien Nguyen
(74) *Attorney, Agent, or Firm* — Hunton & Williams LLP

(57) ABSTRACT

The invention provides a method and system that performs transaction processing using a payment bookmark that is associated with a user bookmarked link. The system includes a computer processor constituted by a communication portion; a database; and a bookmark processing portion. The communication portion interfaces with the user to input selection of a payment bookmark, and upon selection of the payment bookmark, the computer processor invoking the bookmark processing portion, and the payment bookmark being mapped to the user bookmarked link (UB link) stored in the database. The UB link is constituted by UB link data, and the UB link data including core link data. The bookmark processing portion performs processing to retrieve available transaction data to append to the core link data of the UB link. The bookmark processing portion outputs the UB link including the UB link data to a server over a network.

19 Claims, 16 Drawing Sheets

(56) References Cited

U.S. PATENT DOCUMENTS

| | | | |
|---|---|---|---|
| 2009/0112821 A1* | 4/2009 | Collet | G06F 17/30884 |
| 2010/0241704 A1* | 9/2010 | Ahn | G06F 17/30884 709/203 |
| 2013/0126610 A1* | 5/2013 | Aihara et al. | 235/383 |

OTHER PUBLICATIONS

Li, W-S. et al.; "PowerBookmarks: A System for Personalizable Web Information Organization, Sharing, and Management"; Proceedings of the 1999 ACM SIGMOD International Conference on Management of Data (SIGMOD 99); Philadelphia, Pennsylvania; 1999, pp. 1375-1389.*

Abrams, D. et al.; "Information archiving with bookmarks: personal Web space construction and organization"; Proceedings of the SIGCHI conference on Human factors in computing systems (CH1'98); 1998; Los Angeles, California; pp. 41-48.*

Cockburn, A. et al.; "What Do Web Users Do? An Empirical Analysis of Web Use"; Int. J. Human-Computer Studies; vol. 54, No. 6; Jun. 2001; pp. 903-922.*

* cited by examiner

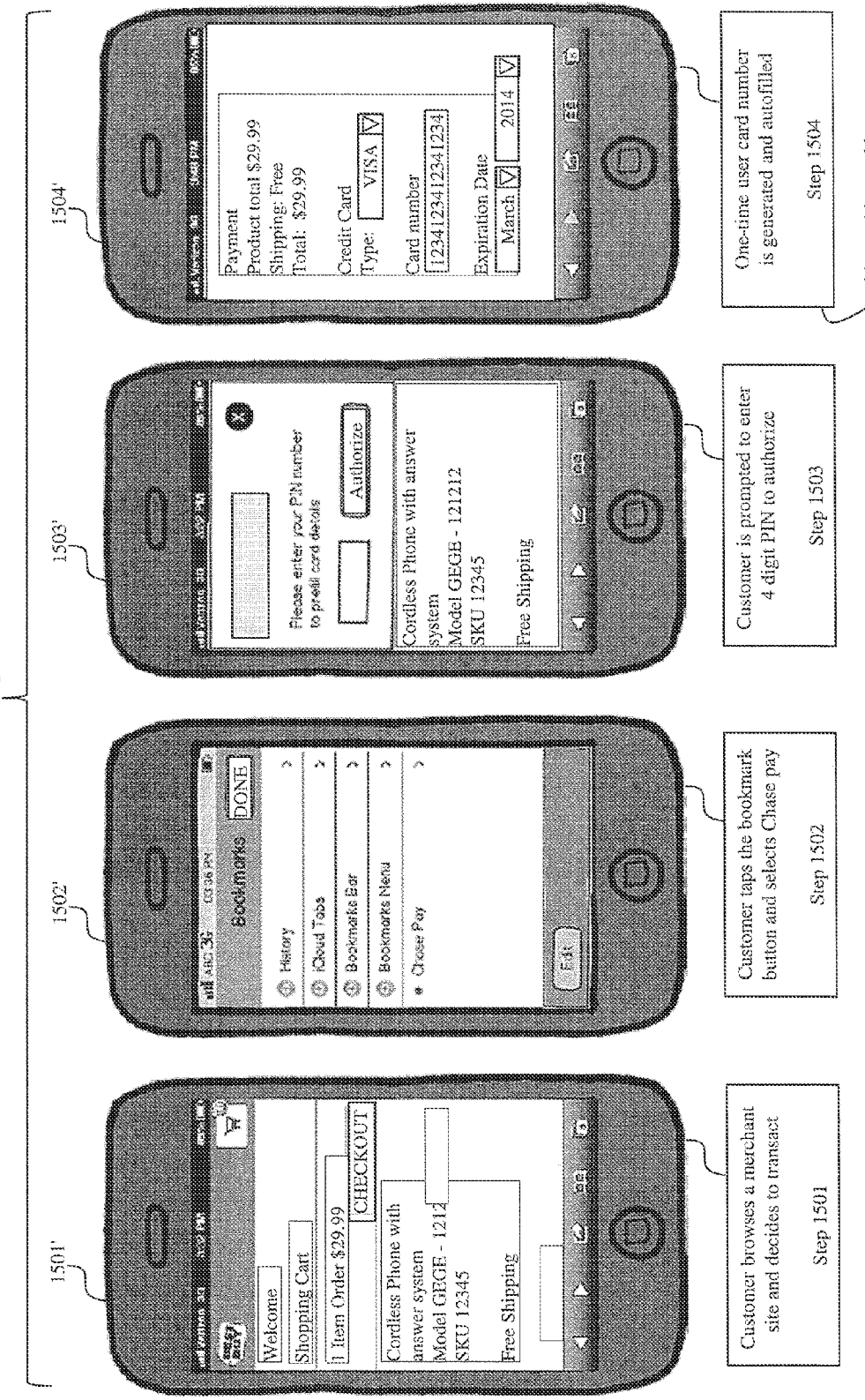

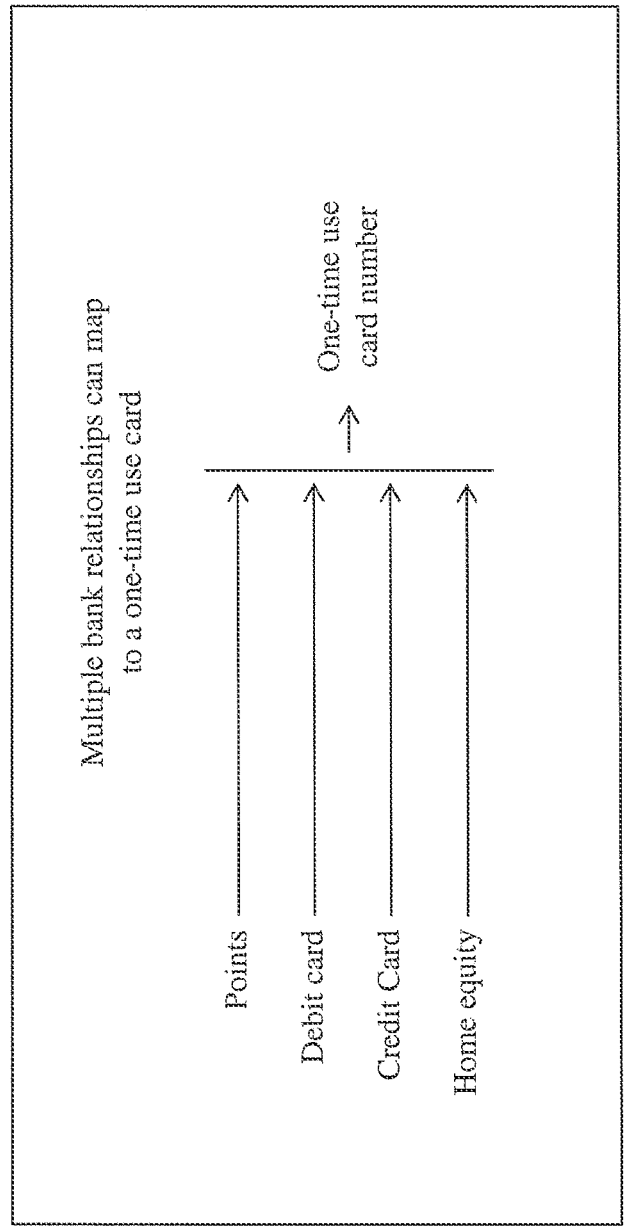

SYSTEMS AND METHODS FOR BOOKMARK PAYMENT PROCESSING

This application claims priority to U.S. Provisional Patent Application 61/866,249 filed Aug. 15, 2013, the content of which is incorporated herein by reference in its entirety.

BACKGROUND OF THE INVENTION

The systems and methods described herein relate to payment processing and related processing.

In the present technological environment, people routinely perform online transactions. For example, such online transactions might be in the form of a user purchasing an item from a particular merchant's website. Such processing typically involves the user interfacing with the merchant website so as to select a particular item to be purchased, and thereafter completing the purchase through further interface with the merchant website. Such further interfacing with the merchant website may include the population of fields so as to collect the user's personal data (such as home address and shipping information) and payment data. The payment data might include the user's credit card number, expiration date and related information, for example.

However, current processing techniques are insufficient in some respects to provide desired convenience for people and insufficient in some respects to provide secure and efficient processing of a requested transaction.

Therefore, improvements are needed to accommodate the evolving needs of people in performing online transactions. The systems and methods of the invention provide such improvements.

BRIEF SUMMARY OF THE INVENTION

The invention provides a method and system that performs transaction processing using a payment bookmark that is associated with a user bookmarked link, the system disposed on a user computer. The system comprising a computer processor constituted by a communication portion; a database; and a bookmark processing portion. The communication portion interfaces with the user to input selection of a payment bookmark, and upon selection of the payment bookmark, the computer processor invoking the bookmark processing portion, and the payment bookmark being mapped to the user bookmarked link (UB link) stored in the database. The UB link is constituted by UB link data, and the UB link data including core link data. The bookmark processing portion performs processing to retrieve available transaction data to append to the core link data of the UB link, such processing being performed based on a set of rules, and such available transaction data constituting transaction link data. The bookmark processing portion appends any retrieved transaction link data to the core link data based on the set of rules, such that the UB link data includes (1) core link data and transaction link data, if transaction data was available to retrieve, and the UB link data includes (2) core link data without transaction link data, if transaction link data was not available to retrieve. The bookmark processing portion outputs the UB link including the UB link data to a server over a network.

BRIEF DESCRIPTION OF THE DRAWINGS

The present invention can be more fully understood by reading the following detailed description together with the accompanying drawings, in which like reference indicators are used to designate like elements, and in which:

FIG. 15 is a flowchart showing a series of steps (1501-1504) and associated GUIs (1501'-1504') showing aspects of bookmark payment processing in accordance with one embodiment of the invention.

FIG. 16 is a diagram showing the multiple bank relationships can map to such a one-time use card number, in accordance with one embodiment of the invention.

DETAILED DESCRIPTION OF THE INVENTION

Figure 1:
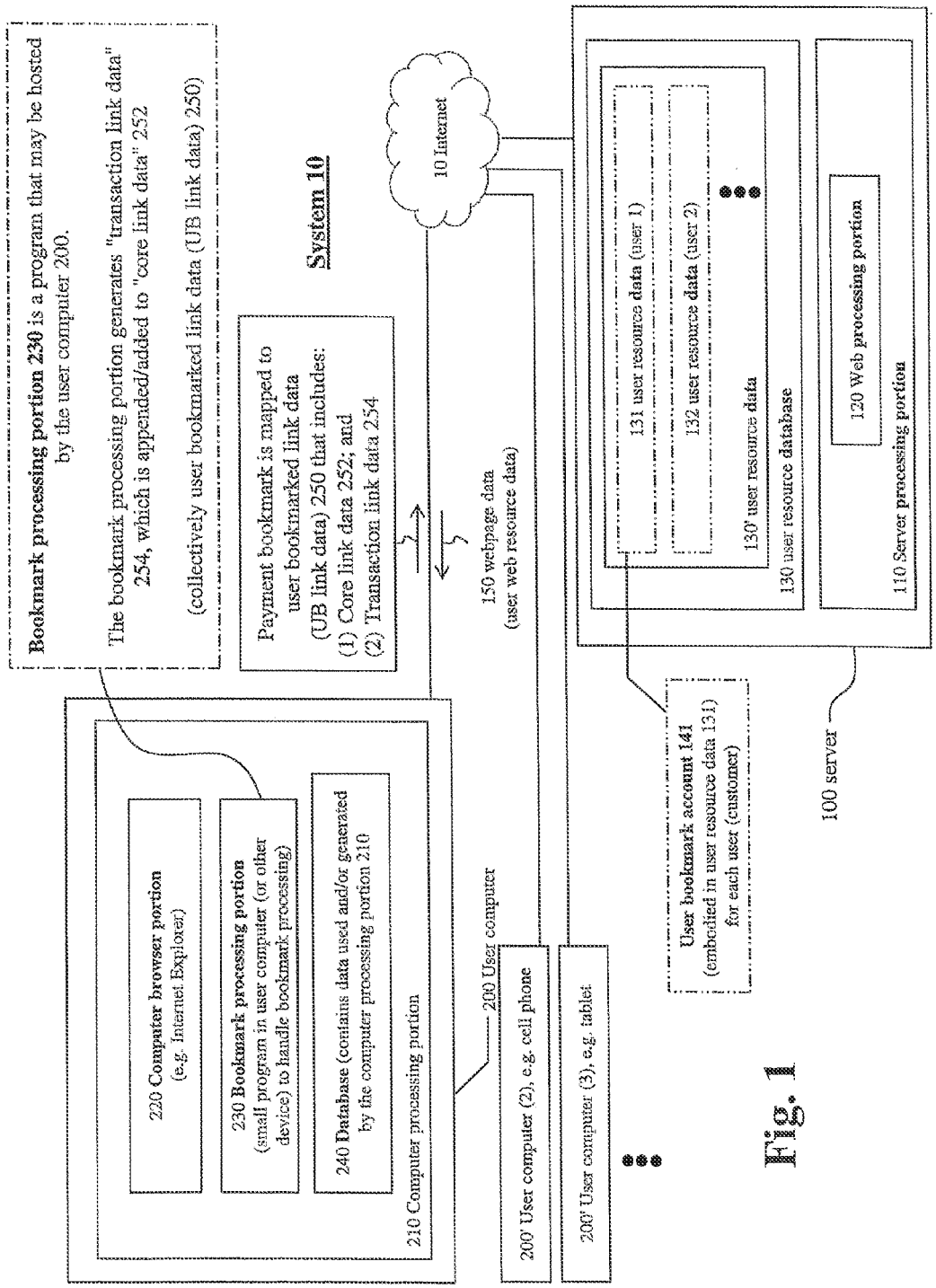
FIG. 1 is a block diagram showing a system that implements bookmark payment processing, in accordance with one embodiment of the invention.

Hereinafter, aspects of the invention in accordance with various embodiments will be described. As used herein, any term in the singular may be interpreted to be in the plural, and alternatively, any term in the plural may be interpreted to be in the singular.

In particular, the invention is directed to "bookmark payment processing" and provides a user with a quick and efficient approach to perform transaction payments when shopping online. In particular, the invention leverages web browser "bookmark," "favorites" technology, and/or similar technology. The user sets up, and is thereafter able to use, a bookmark in his or her web browser. The bookmark is linked to a customized data set on a financial entity web site, such as Chase.com site, for example. The customized data set is presented to the user in the form of a webpage. The invention is conducive to the mobile environment, such as on a user's cell phone, laptop computer or tablet, for example, as well as various other devices.

In one embodiment, the user initially sets up a bookmark in her web browser. After the bookmark is set up, the user may then use bookmark payment processing to fulfill transactions. In accordance with one embodiment of the invention, to set up a bookmark, the user navigates to a suitable webpage on the Chase.com site. The Chase.com webpage interfaces with the user to create the bookmark, including various preferences that are associated with the particular bookmark. For example, the preferences might include the particular merchant for which the bookmark may be used, the particular credit card that will be used to fulfill transactions, the preferred shipping address, as well as the preferred billing address. The preferences may also include rules to control the particular credit card, for example, that is used for a transaction. For example, if the transaction amount is above a particular dollar amount, then a first credit card might be utilized. On the other hand, if the transaction amount is equal to or below the particular dollar amount, then another credit card might be utilized. In creation of a bookmark, the user may adjust a variety of settings and preferences for the bookmark.

Once the bookmark is created, the user may then use the bookmark in transactions as desired, i.e., transactions that satisfy the particular rules for which the bookmark was created. For example, if the preferences set in creating the bookmark designated only certain merchants, then use of the bookmark would be limited to those merchants, in accordance with one embodiment of the invention.

Illustratively, in use of the bookmark, the user browses a merchant website and decides to transact an order to purchase a particular item or service, for example. At a point in the transaction processing with the merchant, the user taps a checkout button, for example. In accordance with one embodiment of the invention, upon the user tapping the "checkout" button, bookmark payment processing is invoked either automatically or by the user. For example, the merchant site may be programmed to be aware that the user utilizes the bookmark payment processing, in accordance with one embodiment of the invention. Accordingly, at checkout, the merchant site may automatically route the user in such manner that the user may choose the particular bookmark, i.e., the particular bookmark that the user wishes to use for the particular transaction. Upon tapping the desired bookmark, the user is then routed to a payment webpage. For example, the payment web page might be maintained by a suitable financial entity (such as Chase.com), the merchant, and/or some third party. In interfacing with the payment webpage, the user may initially be required to enter a suitable pin, such as a 4 digit PIN, or may be required to enter some other credentials to verify her identity. Other authorization methodology might be utilized as desired, such as biometrics, for example. Once the user enters the PIN (personal identification number) and/ or is otherwise authorized, the particulars of the transaction are presented to the user to review—prior to submitting the payment. For example, details that are presented to the user might include the dollar amount, the merchant, the credit card used to perform the transaction, and other details. In conjunction with the presentment of such details, the user may be presented with a one-time use card number that is generated by the bookmark payment processing system. The one-time use card number may or may not be associated with address information of the user. Once the user reviews the information, the user submits the transaction, such as by tapping a suitable button. The payment is then routed across a payment network for processing.

In one embodiment of the invention, bookmark payment processing is performed using a web browser on the user's personal computer or phone, for example, that interfaces directly with the Chase.com website. In some embodiments, a local application might be utilized on the user's computer or phone, which handles at least some of the processing associated with the bookmark payment processing.

Various history of transactions using bookmark payment processing may be retained and accessible by the user. In one embodiment, the user may go to her account on Chase.com and click a button for bookmark payment processing history. In response, the Chase.com system will generate and display various history and other related data to the user. Additionally, bookmark payment processing may include "wish list" functionality. With such functionality, the user may, over time, select a variety of items, for example, that is of interest to the user. The wish list might be made available to the user's friends, for example, i.e., such that the friends may purchase the items for the user. The wish list is not limited to a particular merchant, but rather may include desired purchases over a variety of merchants.

In accordance with one embodiment of the invention, FIG. 1 is a block diagram showing a system 10 that implements the bookmark payment processing of the invention. In the embodiment of FIG. 1, the system 10 includes a server 100 and a user computer 200. The server 100 may be in the form of a computer processor that performs the various processing, including operations and functionality for example, as described herein.

The server 100 performs various general processing including to input and output communications with a user. The server 100 includes a specialized processing portion constituted by a web processing portion 120, in accordance with one embodiment of the invention. In particular, the web processing portion 120 performs various processing associated with the "bookmark payment processing" of the invention.

In the processing performed by the web processing portion 120, various data may be used, called upon, generated, input, output, manipulated, and/or processed in some other manner, for example. In this embodiment, such data is stored in the user resource database 130. In particular, the user resource database 130 contains user resource data 130' for multiple users, i.e., user resource data 131 (for user 1), user resource data 132 (for user 2), and so forth. It is appreciated that the user resource database 130 may contain data for many users, i.e., thousands or millions of users. Each user resource data 130' for a particular user constitutes a user bookmark account 141 for that particular user. In other words, as characterized herein, a user bookmark account 141 is embodied in the form of each respective user resource data 130'. In accordance with one embodiment of the invention, the system 10 also includes the user computer 200. The user computer 200 might be in the form of a personal computer or a smart phone, for example, or any other suitable device. It is appreciated that the system 10 may include thousands or millions of other user computers, reflected in FIG. 1 as user computers 200'.

As shown in FIG. 1, the user computer 200 includes a computer processing portion 210. The computer processing portion 210 includes a computer browser portion 220. The computer browser portion 220 might be in the form of INTERNET EXPLORER or GOOGLE CHROME, for example. The computer processing portion 210 also includes a bookmark processing portion 230, in accordance with the invention. The bookmark processing portion 230 may be in the form of a small program on the user computer that handles the bookmark payment processing of the invention. For example, the bookmark processing portion 230 may be in the form of an applet on the user's computer. The user computer also includes a database 240 to handle storage of the various data used by the user computer 200.

Accordingly, in one embodiment of the invention, the bookmark processing portion 230 may be constituted by a program that is hosted by the user computer 200. The bookmark processing portion, as described herein, generates "transaction link data" 254 and appends and/or adds the transaction link data 254 to the user bookmarked (UB) link data 250. The UB link data 250 also includes core link data 252.

More specifically in accordance with one embodiment of the invention, in performing bookmark payment processing, the user navigates to or brings up her browser application 220, such as INTERNET EXPLORER. The user then clicks a payment bookmark. The browser together with the bookmark processing portion 230 (of the user device) retrieves a user bookmarked link (UB) link, which is mapped to the payment bookmark. The UB link includes core link data 252. The core link data 252 includes, in particular, the network address of the server 100 that interfaces with the user device 200 to perform bookmark payment processing. That is, for example, the core link data 252 might include the uniform resource locator (URL) of a banking website, such as Chase.com. The bookmark processing portion 230 appends transaction link data 254 to the UB link data 250, if transaction link data 254 is available.

As described further below, the UB link data 250 is then output to the designated server and processed by the server. In such processing performed by the server, the UB link data 250 is mapped into user resource data 130'. As noted above, user resource data 131, for a particular user, may be characterized as constituting a user bookmark account 141. Based on the mapping into the user resource data 131, of the particular user, webpage data 150 is generated for that particular user. The webpage data is then output over the network from the server 100 to the user device 200, i.e. to a user computer. The webpage data is displayed on the user computer as a webpage.

Figure 2:
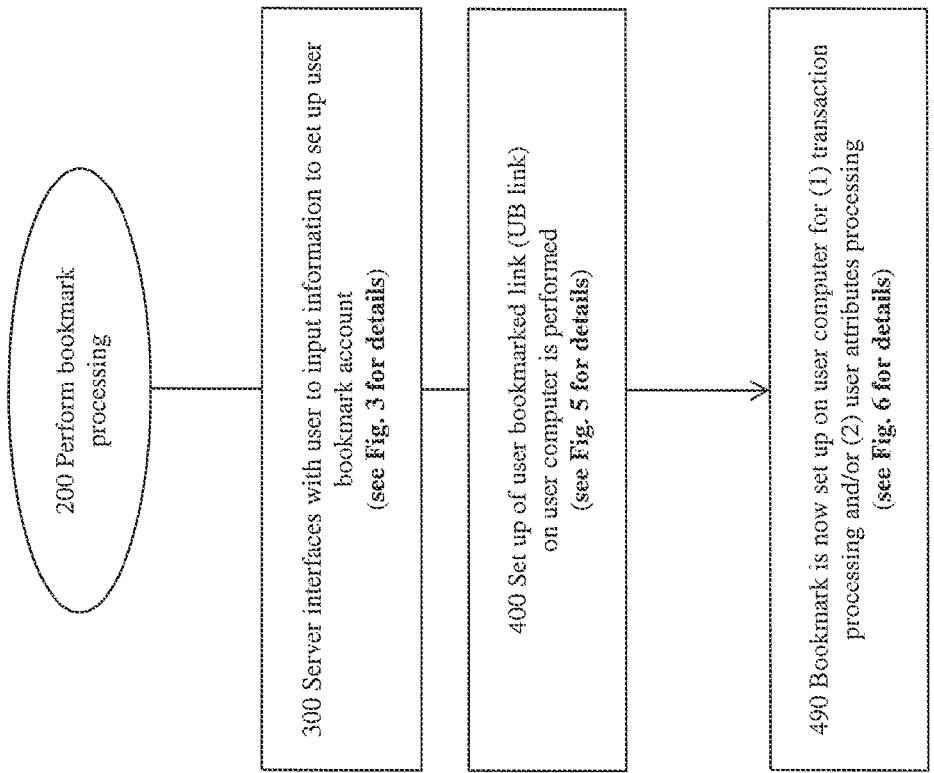
FIG. 2 is a high-level flowchart showing bookmark payment processing in accordance with one embodiment of the invention.

Hereinafter, various further features of the invention are described. FIG. 2 is a high-level flowchart showing bookmark payment processing in accordance with one embodiment of the invention. The described processing of FIG. 2 may be performed by the server 100 of FIG. 1, for example or other suitable processing system. As shown, the processing of FIG. 2 starts 200 and passes to step 300.

In step 300, the server (for example the server 100 of FIG. 1) interfaces with the user computer 200 (for example a cell phone or smartphone) to input information to set up a user bookmark account 141. Further details of the processing of step 300 are described below with reference to FIG. 3. After step 300 of FIG. 2, the process passes to step 400.

In step 400, processing is performed to set up a user bookmarked link on the user computer. Further details of the processing of step 400 are described below with reference to FIG. 5. After step 400, the process passes to step 490.

In step 490, the bookmark, i.e. the payment bookmark, is then set up on the user computer. As described below, the payment bookmark may be used for user transaction processing and/or to perform user attributes processing via webpage, i.e., user transaction webpage processing and/or to perform user attributes webpage processing, respectively. In user attributes processing, the user interfaces with the server 100 to effect changes to preferences and/or settings, and other attributes of their account, for example. In user transaction processing, the user interfaces with the server 100 to effect transactions and/or to secure credentials to perform transactions, for example. Various further aspects of user transaction processing and user attributes processing are described below.

Figure 3:
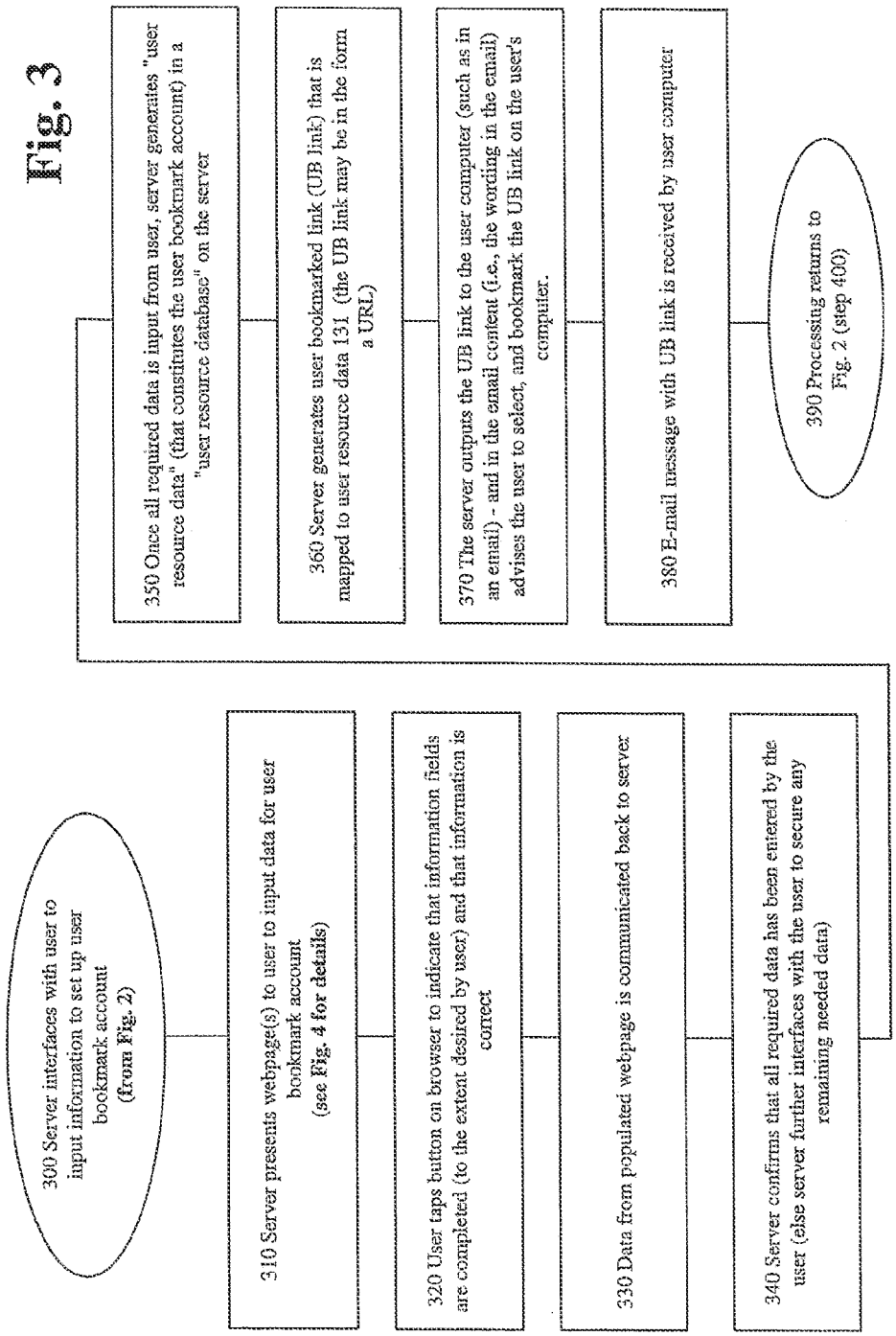
FIG. 3 is a flowchart showing further details of the server interfaces with the user to input information to set up a user bookmark account (step 300 of FIG. 2) in accordance with one embodiment of the invention.

FIG. 3 is a flowchart showing further details of the server interfaces with the user to input information to set up a user bookmark account (step 300 of FIG. 2) in accordance with one embodiment of the invention.

As shown in FIG. 3, the processing starts in step 300 and passes to step 310. In step 310, the server presents a webpage, or a series of webpages, to the user to input data for the user bookmark account. Further details of this input of data, i.e. input of information, is described below with reference to FIG. 4. After step 310 of FIG. 3, the process passes to step 320. In step 320, the user taps a suitable button on her browser to indicate that the information fields are completed, to the extent desired by the user, and that the information is correct. Then, in step 330, the data from the populated webpage is communicated back to the server. Then, the process passes to step 340.

In step 340, the server confirms that all required data has been entered by the user. If all required data has not been entered by the user, then the server further interfaces with the user to secure any remaining needed data. For example, in the webpage presented to the user, required fields may be indicated by some suitable indicia, such as a red*. If in step 340, the server determines that all such fields have not been populated by the user, then the server will perform such further interfacing to secure the needed data. After step 340, the process passes to step 350.

In step 350, once all the required data has been input from the user, the server generates user resource data for the particular user. For example, such user resource data may be constituted by the user resource data 130' as shown in the user resource database 130 of the server 100 (shown in FIG. 1). As reflected in step 350 of FIG. 3, the user resource data may be characterized as constituting the user bookmark account disposed in the user resource database 130.

After step 350 of FIG. 3, the process passes to step 360. In step 360, the server generates a user bookmarked link (UB link) that is mapped to the user resource data 131, for example. That is, each respective user is provided with a corresponding UB link that is mapped to that user's particular user resource data 130'. The UB link may be in the form of a URL.

Then, in step 370, the server outputs the UB link to the user computer. In accordance with one embodiment of the invention, the UB link might be included in an e-mail to the user. In the e-mail content, i.e. in the wording of the e-mail, are instructions to advise the user to select the UB link, and then bookmark the UB link on the user's computer. Accordingly, with such feature, the user is sent an e-mail containing the UB link with instructions. Upon receipt, the user opens the e-mail, which was received from the server. The user then clicks the UB link to pull data from the server, including data from the particular user's user resource data 130'. And upon receipt of the link from the user, the server provides such data to generate a webpage that is displayed on the user's computer. Further aspects of such processing of step 370 are described below with reference to FIG. 5.

Step 380 of FIG. 3 reflects completion of the above described processing. That is, step 380 reflects that the e-mail message with the UB link is received by the user computer. Then, in step 390, the process returns to FIG. 2, and specifically to step 400.

Figure 4:
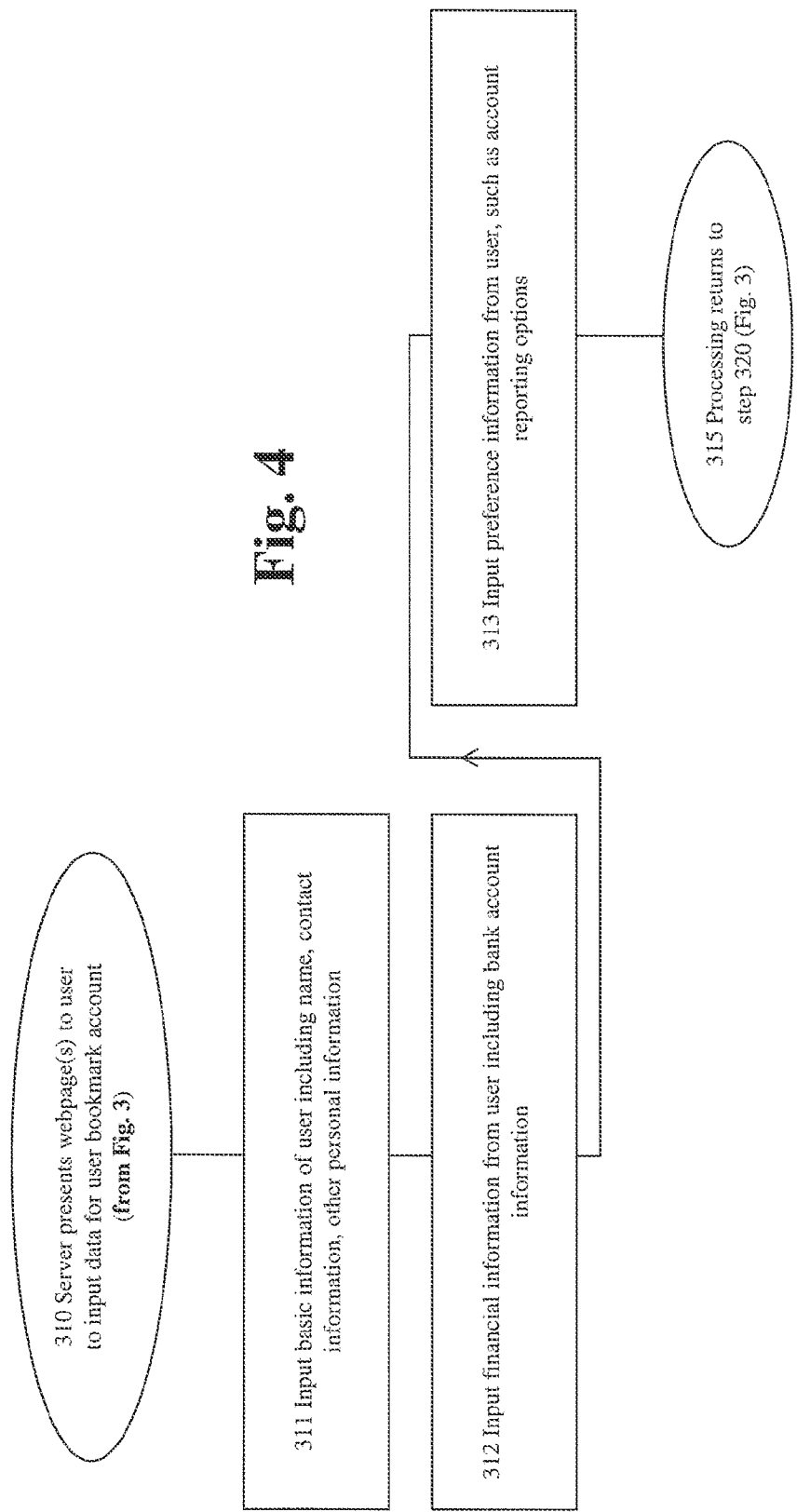
FIG. 4 is a flowchart showing further details of the "server presents webpage(s) to the user to input data for user bookmark account" (step 310 of FIG. 3) in accordance with one embodiment of the invention.

FIG. 4 is a flowchart showing further details of the "server presents webpage(s) to the user to input data for user bookmark account" (step 310 of FIG. 3) in accordance with one embodiment of the invention. As shown, the process starts in step 310 and passes to step 311. In step 311, the user interfaces with the webpage (generated by the server 100) to input basic information of the user including name, contact information, as well as any other personal information as desired. Then, the process passes to step 312.

In step 312, the user interfaces with the webpage to input financial information of the user. In particular, such financial information of the user might include bank account information of accounts the user wishes to have associated with his or her user bookmark account. Then, the process passes to step 313.

In step 313, the user interfaces with the webpage (generated by the server 100) to input information from the user such as account reporting options. For example, such information might include whether the user wishes to receive paper statements for her user bookmark account, online statements for her user bookmark account, the format of statements, the periodicity in which statements are forwarded, and/or any other preference information as desired.

After step 313 of FIG. 4, the process passes to step 315. In step 315, the processing returns to step 320 of FIG. 3. Thereafter, the processing proceeds as described above with reference to FIG. 3.

Figure 14:
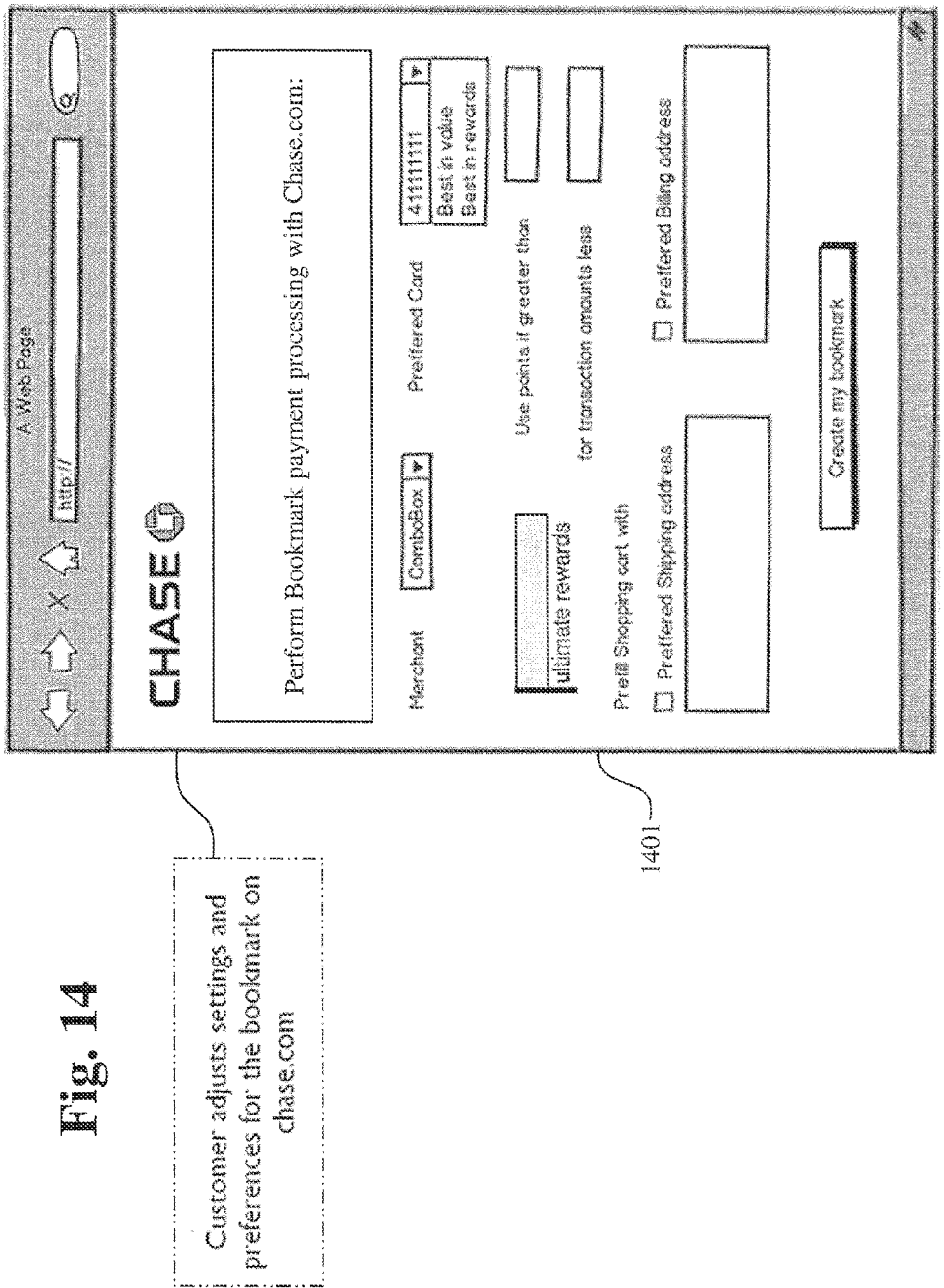
FIG. 14 is a graphical user interface (GUI) 1401 presented to the user for creation of a bookmark, in accordance with one embodiment of the invention.

As described above and with reference to FIG. 4, in step 310 of FIG. 3 the server presents a webpage, or a series of webpages, to the user to input data for the user bookmark account. In further illustration of such processing and in accordance with one embodiment of the invention, FIG. 14 is a graphical user interface (GUI) 1401 presented to the user for creation of a bookmark. As shown, the user populates fields in the GUI for creation of a bookmark. Specifically, the user designates the merchant to be used with the bookmark. Also, the user designates a preferred card or cards to be used with the bookmark. Relatedly, the user might specify more than one card to use, in conjunction with rules to control the particular card used in a transaction. For example, the particular rules might relate to "best in value" or "best in rewards", for example. Various other preferences may be set relating to rewards, transaction amounts, shipping address information and billing address information, for example. Once the user has populated the fields of the GUI 1401, the user taps the "create my bookmark" in order to push the data back to the server 104 generation of the bookmark, i.e., in similar manner as described above with reference to step 330 of FIG. 3.

Figure 5:
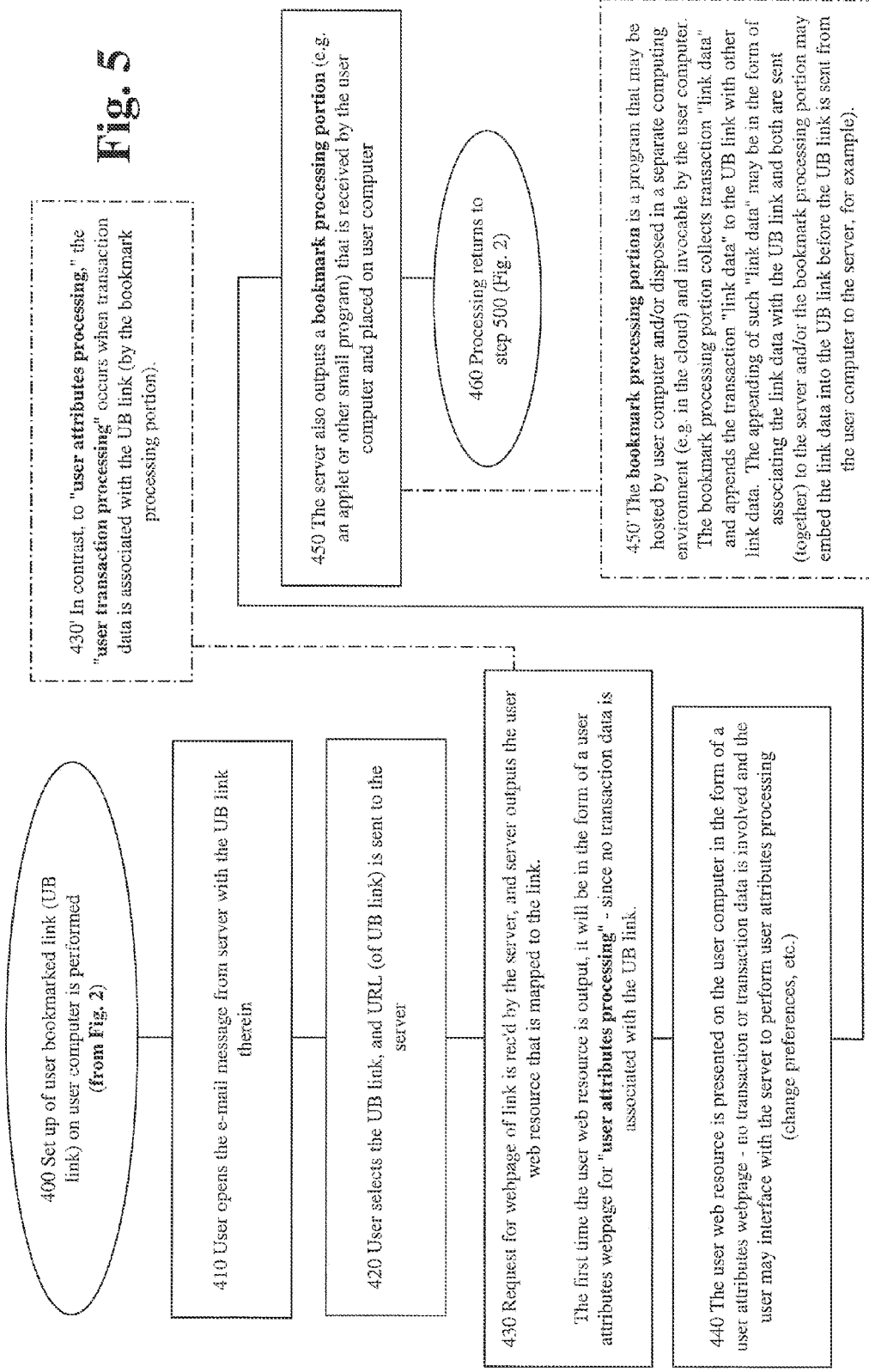
FIG. 5 is a flowchart showing further details of the "set up of user bookmarked link (UB link) on user computer is performed" (step 400 of FIG. 2) in accordance with one embodiment of the invention.

FIG. 5 is a flowchart showing further details of the "set up of user bookmarked link (UB link) on user computer is performed" (step 400 of FIG. 2) in accordance with one embodiment of the invention. In particular, processing described hereinafter with reference to FIG. 5 provides further detail of the processing (of the server 100) described above with reference to step 370 of FIG. 3. As shown in FIG. 5, the process starts in step 400 and passes to step 410.

In step 410, the user opens the e-mail message from the server. That is, the user opens the e-mail message with the UB link therein. As noted above, the user may be provided with suitable instructions in the content of the e-mail. Then, in step 420, the user selects the UB link. Upon the user selecting the UB link, the URL (of the UB link) is sent to the server. Then, the process passes to step 430. In step 430, the request is received by the server. The server then outputs the user web resource that is mapped to the link. More specifically, in response to receiving the UB link (which contains what is herein characterized as UB link data 250) the server generates webpage data 150. In such generation of the webpage data 150 (see FIG. 1), the server maps the UB link data 250 into the user resource data 131 (for the particular user). It is appreciated that in generation of such webpage data 150, the data that is actually pulled from the user resource data 131 may be combined with data that is not unique to the particular user. Accordingly, the server generates the webpage data 150 using a variety of data, some of which is constituted by data pulled from the user resource data 131.

As reflected in step 430, it is appreciated that the first time the user web resource (based on the user resource data 131) is output to the user, such user web resource will be in the form of a user attributes webpage, i.e. for user attributes processing. This is because no transaction or transaction data is involved the first time the user uses the UB link to pull user web resource data from the server 100. Block 430' of FIG. 5 reflects that in contrast to "user attribute processing" of step 430, what is characterized as "user transaction processing" occurs when transaction data is indeed associated with the UB link. The association of such transaction data with the UB link is performed by the bookmark processing portion 230, in the user computer 200. Such association of data related to a transaction is described below in detail.

After step 430 of FIG. 5, the process passes to step 440. In step 440, the user web resource is presented on the user computer in the form of a user attributes webpage. As noted above, no transaction data is associated with such presentment. The user may then interface with the server, via the webpage, to perform user attributes processing, including changing preferences, for example.

Then, after step 440 of FIG. 5, the process passes to step 450. Step 450 reflects that the server also outputs additional data (in response to receiving the UB link data 250), i.e., additional data in addition to the data used to generate the user attributes webpage. More specifically, the server also outputs a bookmark processing portion that is received by the user computer 200 and placed on the user computer 200. For example, the bookmark processing portion might be in the form of an applet or other small executable program that is stored on the user computer 200. The bookmark processing portion may be transferred from the server 100 to the user computer 200 in the form of data representing programming code, and thereafter constituted by programming code disposed on a tangibly embodied computer medium in the user computer 200, in accordance with one embodiment of the invention.

After step 450, the processing of FIG. 5 passes to step 460. In step 460, the process returns to step 500 of FIG. 2.

Block 450' of FIG. 5 sets forth further details of the bookmark processing portion, in accordance with one embodiment of the invention. The bookmark processing portion may be in the form of a program that may be hosted by the user computer and invocable by the user computer. The bookmark processing portion collects "transaction link data" 254 and appends the "transaction link data" to the UB link with other link data. Such other link data may include what is characterized herein as core link data 252. The appending of such "transaction link data" may be in the form of associating the link data with the UB link and both are sent (together) to the server and/or the bookmark processing portion may embed the link data into the UB link in some manner before the UB link is sent from the user computer to the server, for example).

As noted above, the bookmark processing portion is a program that may be hosted by the user computer. Also, the bookmark processing portion may be hosted, i.e. disposed, in a separate computing environment (e.g. in the cloud) and invokable, i.e., able to be invoked, by the user computer. Further, the bookmark processing portion may be partially hosted on the user's computer and partially hosted in some separate computing environment, such as in a "cloud" processing environment. Accordingly, it is appreciated that all or a portion of the bookmark processing portion might be hosted locally and/or in a separate computing environment—so as to be invocable by the user computer.

Figure 6:
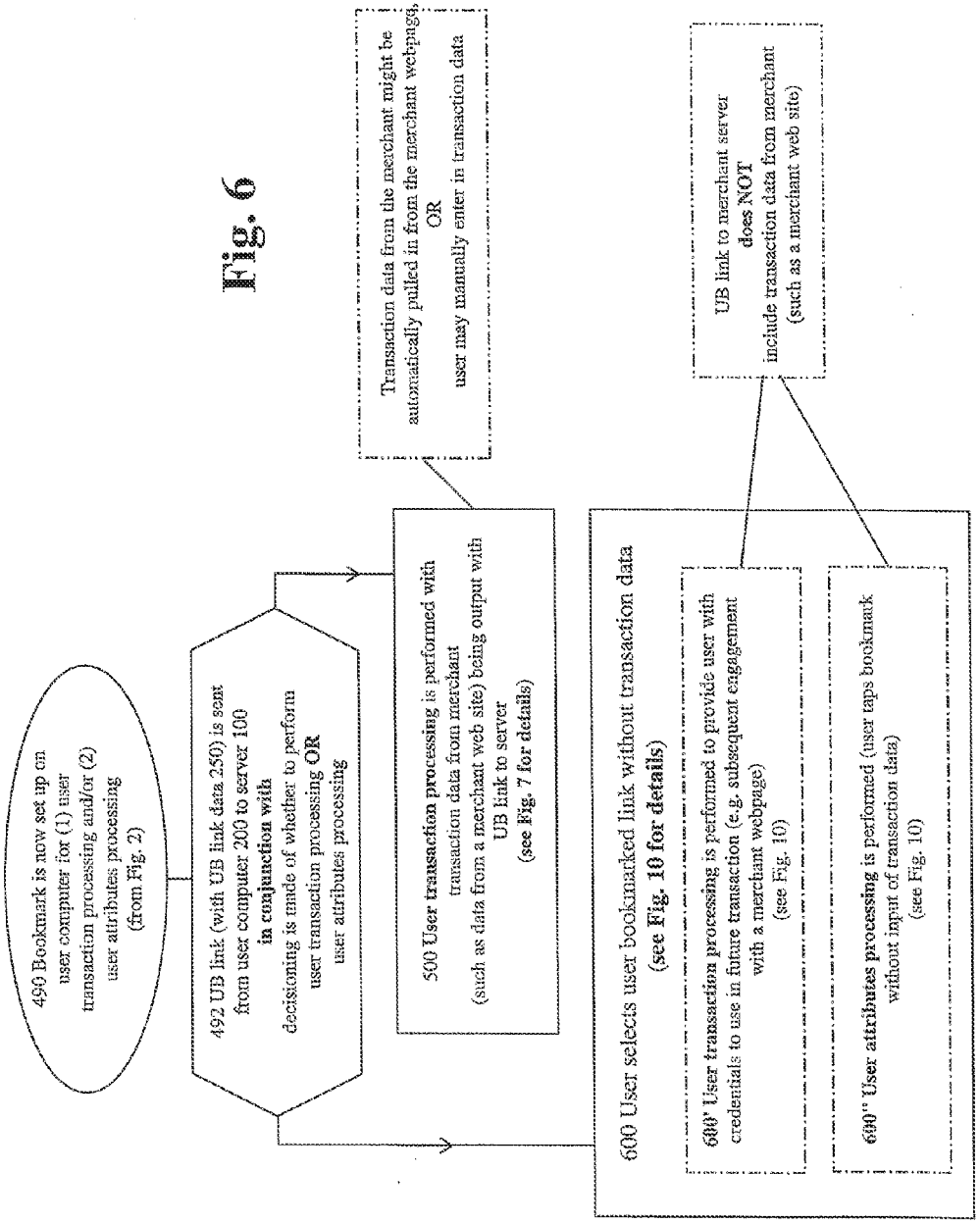
FIG. 6 is a flowchart showing further details of the "bookmark is now set up on user computer for (1) user transaction processing and/or (2) user attributes processing (step 490 of FIG. 2) in accordance with one embodiment of the invention.

FIG. 6 is a flowchart showing further details of the "bookmark is now set up on user computer for (1) user transaction processing and/or (2) user attributes processing (step 490 of FIG. 2) in accordance with one embodiment of the invention.

As shown in FIG. 6, the processing starts in step 490 and passes to step 492. In step 492, decisioning is performed based on input data that dictates whether the server (once a UB link is received from the user computer) will perform user attributes processing and/or user transaction processing. The input data that effects such decisioning might be the presence of transaction data, or alternatively the absence of transaction data. Alternatively, or in addition to, the input data that effects such decisioning might be data representing user input. For example, the user might interface with the webpage (generated by the server 100) to indicate that the user wishes to perform user attributes processing and/or user transaction processing. Such processing decision might be performed at the user computer 200 and/or at the server 100.

As shown in FIG. 6, the processing of data and decisioning of step 492 may result in the processing passing to either step 500 or step 600. Further details of such processing are described below.

The processing and decisioning of step 492 may result in the process passing to step 500. As shown in FIG. 6, the processing of step 500 reflects that user transaction processing is performed, with transaction data from a merchant being output with the UB link to the server 100. Accordingly, the processing of step 500 reflects the situation where transaction data has been input as a result of the user performing a transaction with a merchant. Illustratively, the transaction might be with a merchant website. However, it is appreciated that the systems and methods of the invention might be utilized with a wide variety of point of sales (POSs). In the processing of step 500, it is appreciated that transaction data from the merchant may be automatically pulled in from the merchant POS, such as from the merchant website, in accordance with one embodiment of the invention. On the other hand, the user may manually enter in the transaction data when performing bookmark payment processing. Further details of the processing of step 500 are described below with reference to FIG. 7.

On the other hand, the processing and decisioning of step 492 may result in the process passing to step 600.

In step 600, the user selects the user bookmarked link without the presence of transaction data. Accordingly, the processing of step 600 reflects a situation in which the user taps the payment bookmark, to initiate bookmark payment processing, without a transaction in process, for example.

More specifically, the processing 600' of FIG. 6 illustrates a situation where user transaction processing is performed to provide the user with credentials to use in a future transaction. For example, the bookmark payment processing may be utilized by the user to secure a one-time credit card number for use in a subsequent transaction with a merchant webpage online.

On the other hand, the processing 600" of FIG. 6 illustrates the performance of user attributes processing. With user attributes processing, the user taps the payment bookmark without input of transaction data. The user is then provided the ability to change various attributes of her bookmark account, such as preferences, for example. In each of the processing 600' and 600", the user taps the payment bookmark to effect the UB link being sent from the user computer 200 to the server 100 without transaction data from a merchant.

Further details of the various processing of step 600 are described below with reference to FIG. 10.

Figure 7:
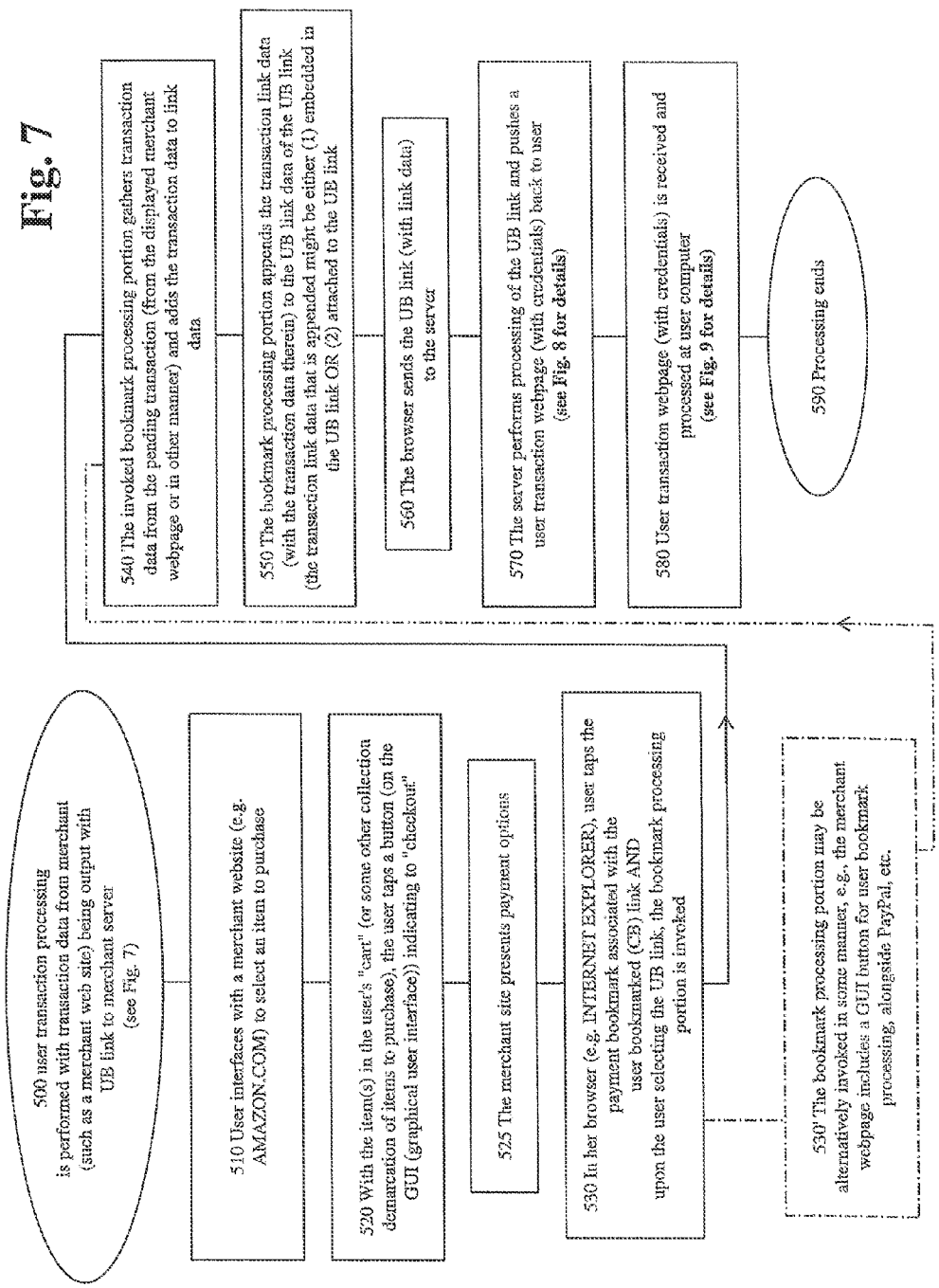
FIG. 7 is a flowchart showing further details of the "user transaction processing is performed with transaction data from merchant being output with UB link to the merchant server (step 500 of FIG. 7) in accordance with one embodiment of the invention.

FIG. 7 is a flowchart showing further details of the "user transaction processing is performed with transaction data from merchant being output with UB link to the merchant server (step 500 of FIG. 7) in accordance with one embodiment of the invention. As shown, the processing of FIG. 8 starts in step 500 and passes to step 510. In step 510, the user interfaces with a merchant POS to select an item for purchase. In the example of step 510, the POS is a merchant website such as AMAZON.COM. Upon the user selecting a particular item for purchase, the item might be placed in a queue for purchase, such as in a cart. After step 510, the process passes to step 520.

In step 520, the item that was selected for purchase is in the user's cart (or some other collection demarcation of items for purchase). The user taps a button, on the GUI of the merchant's website, indicating that the user wishes to check out. That is, the user is satisfied with the item or items that she has purchased, and wishes to effect the transaction to complete the purchase. Then, the processing passes to step 525.

In step 525, the merchant site presents payment options to the user. For example, the merchant site may present options to the user for payment including the use of a credit card and/or PAYPAL, for example. Then, the processing passes to step 530. Upon being presented with the payment options, in her browser, such as INTERNET EXPLORER, the user taps the payment bookmark that is associated with the UB link as described above. Upon the user selecting the UB link, i.e. selecting the payment bookmark, the bookmark processing portion 230 is invoked. Then, the processing passes to step 540. In step 540, the invoked bookmark processing portion gathers transaction data from the pending transaction with the merchant. For example, the data may be gathered from the displayed merchant webpage, via interface with the merchant system, or in some other manner. Relatedly, the bookmark processing portion might gather some data from the merchant webpage and/or from the merchant system in conjunction with interfacing with the user to gather additional needed data to perform the bookmark payment processing. The data that is gathered regarding the transaction is herein characterized as transaction link data 254, as noted above.

The transaction link data 254 (which is generated by the bookmark app patient based on the transaction data) is then added to the UB link data 250. That is, in step 550 of FIG. 7, the bookmark processing portion appends the transaction link data (with the transaction data therein) to the UB link data 250 of the UB link. Accordingly, transaction link data is appended to what is herein characterized as core link data 252—and the core link data 252 with transaction link data 254 collectively constitute the UB link data 250. Then, the process passes to step 560.

In step 560, the browser 220, of the user computer, sends the UB link to the server 100. Then, the processing passes to step 570.

In step 570, the server performs processing of the UB link. Based on this processing, the server 100 pushes a user transaction webpage (with credentials) back to the user computer 200. Such processing is described in further detail with reference to FIG. 8 below, in accordance with one embodiment of the invention. After step 570, the process passes to step 580.

In step 580, the user transaction webpage (with credentials) is then received and processed at the user computer 200. Such processing is described in further detail with reference to FIG. 9 below, in accordance with one embodiment of the invention. After step 580, the processing passes to step 590. In step 590, the processing ends.

As described above, in step 530, upon the user selecting the UB link, the bookmark processing portion is invoked. Step 530' of FIG. 7 shows alternative processing. Step 530' reflects that the bookmark processing portion 230 may be invoked in some alternative manner in accordance with embodiments of the invention. For example, the merchant webpage might include a GUI button to perform bookmark payment processing. The GUI button might be disposed alongside other GUI buttons to effect payment using a credit card or PAYPAL, for example. Accordingly, upon the user tapping the GUI button to perform "bank payment processing," in accordance with the invention, the bookmark processing portion 230 is invoked. In accordance with one embodiment of the invention, the processing may then pass to step 540 of FIG. 7, and proceed as described above.

Figure 8:
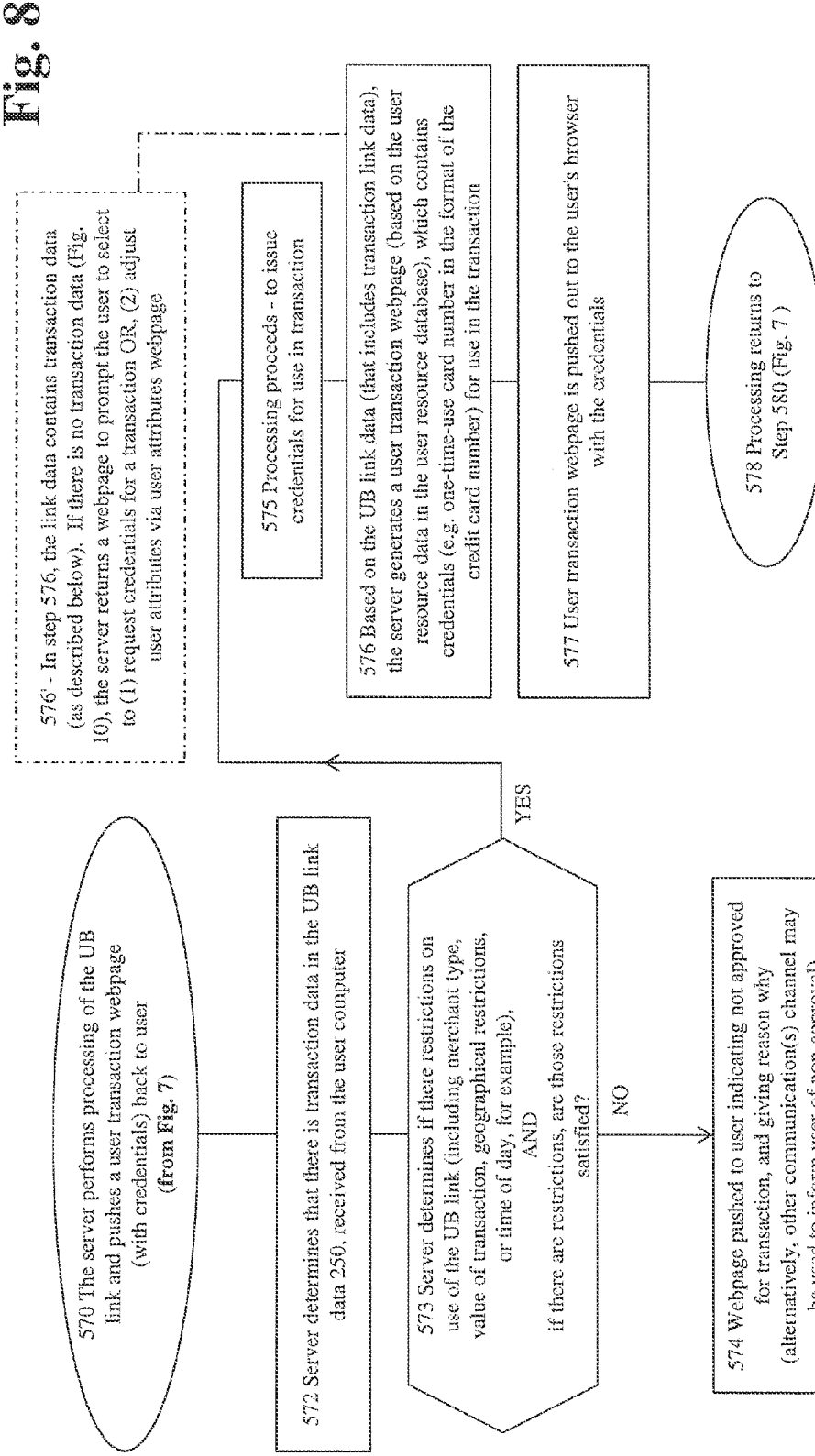
FIG. 8 is a flowchart showing further details of the "server performs processing of the UB link and pushes a user transaction webpage (with credentials) back to user" (step 570 of FIG. 7) in accordance with one embodiment of the invention.

FIG. 8 is a flowchart showing further details of the "server performs processing of the UB link and pushes a user transaction webpage (with credentials) back to user" (step 570 of FIG. 7) in accordance with one embodiment of the invention.

As shown, the process starts in step 570 and passes to step 572. In step 572, the server 100 determines that there is indeed transaction data in the UB link data 250, received from the user computer 200. Then, the process passes to step 573.

In step 573, the server determines if there are any restrictions on the use of the UB link. That is, in the processing of FIG. 8, the user is utilizing the UB link in the context of a particular transaction with particular attributes. It may be the situation that such use of the UB link does not satisfy the restrictions imposed on the use of the UB link. Such restrictions might be imposed by the user setting user preferences and/or such restrictions might be imposed by the server 100, i.e., by the banking entity that maintains the server 100, for example. Accordingly, in the processing of step 573, the server determines if there are restrictions on the use of the UB link including merchant type, value transaction, geographical restriction, time of day, or any other restriction, for example. Relatedly, if there are indeed restrictions imposed on use of the UB link, the server determines if those restrictions are satisfied.

With further reference to FIG. 8, if NO in step 573, i.e., the restrictions are not satisfied, then the processing passes to step 574. In step 574, a webpage is pushed to the user indicating that the transaction is not approved and preferably provides a reason why the transaction was not approved. Alternatively, it should be appreciated that in the situation in which the transaction was not approved, such disposition may be conveyed to the user in any suitable manner. In particular, it is of course appreciated that other communication channels might be used to inform the user of the non-approval of the transaction, such as an e-mail to the user.

On the other hand, if YES in step 573 of FIG. 8, then the processing passes to step 575. In step 575, the processing proceeds to issue credentials for use in the requested transaction. Then, the processing passes to step 576.

In step 576, based on the UB link data, which includes transaction link data 254, the server generates a user transaction webpage, which contains credentials for use in the requested transaction. The user transaction webpage is generated based on the user resource data 130' (for the particular user) in the user resource database 130 (see FIG. 1). For example, the credentials might be in the form of a one-time use card number, which is in the format of a standard credit card number. Such credentials may be used in the transaction as desired.

Once the user transaction webpage with credentials is generated in step 576, the processing passes to step 577. In step 577, the user transaction webpage is pushed out to the user's computer 200 with the credentials. Then, the process passes to step 578.

In step 578, the processing returns to FIG. 7, step 580.

As shown in FIG. 8, the processing of step 576' reflects alternative processing to that described with reference to step 576. That is, step 576 as described above reflects a situation wherein the link data contains transaction data. On the other hand, step 576' reflects a situation in which the link data does not contain transaction data. In such a situation, where there is no transaction data, the server returns a webpage to prompt the user to select one of two options, the first option is to request credentials for a transaction to be performed at some future time. A second option is to interface with the user to adjust user attributes via a user attributes webpage.

Figure 9:
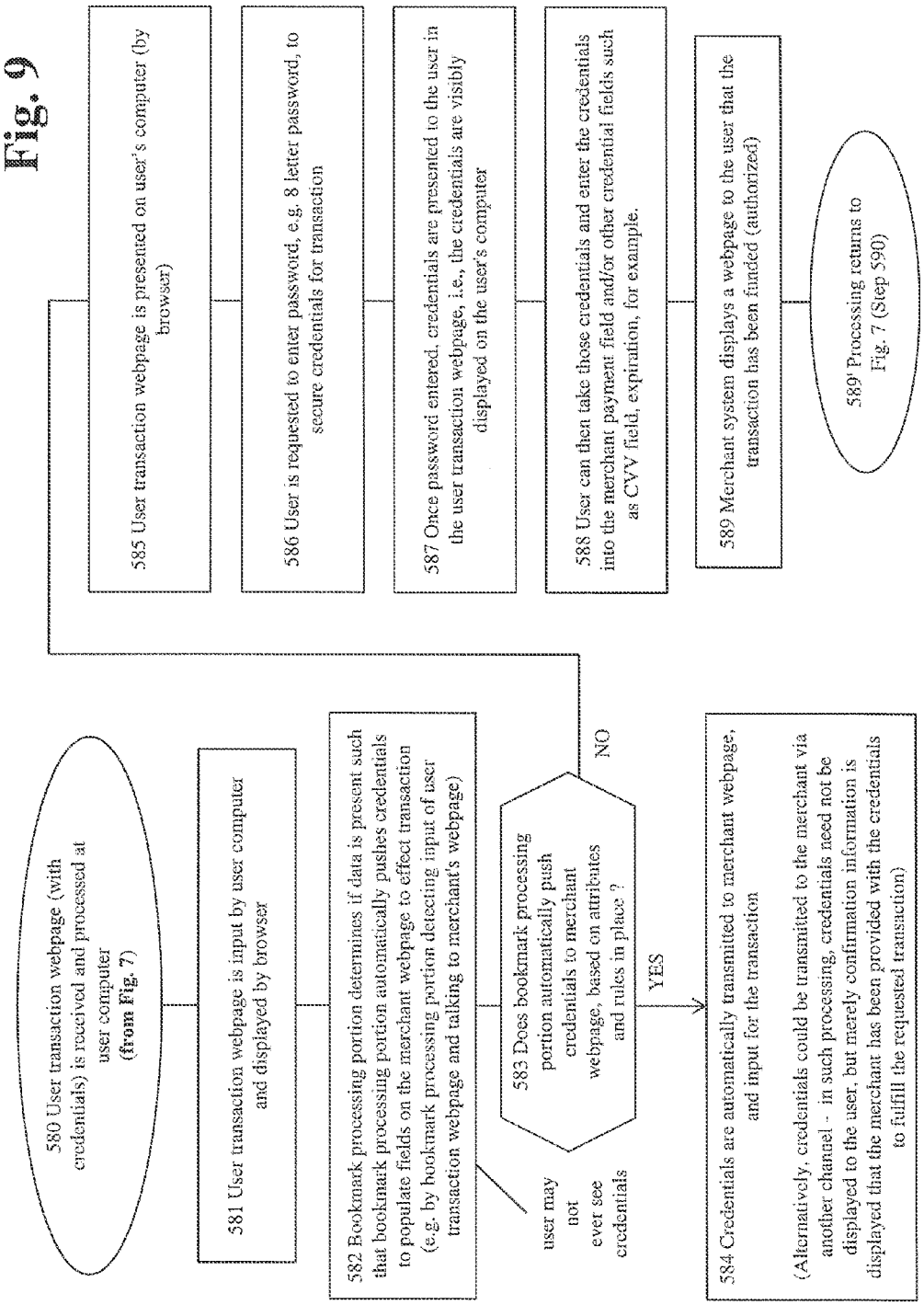
FIG. 9 is a flowchart showing further details of the "user transaction webpage (with credentials) is received and processed at user computer" (step 580 of FIG. 7) in accordance with one embodiment of the invention.

FIG. 9 is a flowchart showing further details of the "user transaction webpage (with credentials) is received and processed at user computer" (step 580 of FIG. 7) in accordance with one embodiment of the invention. As shown, the processing of FIG. 9 starts in step 580, and passes to step 581.

In step 581, the user transaction webpage is input by the user computer and displayed by the computer browser application 220. Then, the process passes to step 582.

In step 582, the bookmark processing portion 230 determines if data is present such that the bookmark processing portion automatically pushes credentials to populate fields on the merchant webpage to effect the desired transaction. For example, the bookmark processing portion on the user computer may detect input of the user transaction webpage from the server. Based upon the bookmark processing portion detecting such webpage, the bookmark processing portion may retrieve the data from the webpage and convey this data to the merchant's webpage. It is appreciated that such data that is retrieved from the transaction webpage and pushed to the merchant's webpage may indeed not be actually visible to the user. That is, the user may, in accordance with some embodiments of the invention, not ever see the credentials, for example. Rather, the user transaction webpage might simply display a message to the user indicating that the credentials (needed for the user's requested transaction) have been output, i.e. transferred, to the merchant webpage, and thus to the merchant system.

Accordingly, in step 583, the bookmark processing portion 230 determines whether the bookmark processing portion, based on a set of rules and the particular attributes in place, will automatically push the credentials to the merchant webpage. If YES in step 583, then the processing passes to step 584.

In step 584, the credentials are indeed automatically transmitted to the merchant webpage and input by the merchant webpage to perform the transaction. In other words, the bookmark processing portion is programmed to pull data from the user transaction webpage and populate fields in the merchant transaction webpage to perform the transaction. Once the fields in the merchant transaction webpage are populated, such data may be automatically push back to the merchant system, or alternatively the user may be prompted to complete the transaction in some manner, such as by tapping a particular button on the GUI.

Alternatively, the credentials needed to complete transaction could be transmitted to the merchant via some other channel. In such processing, credentials (as noted in the example above) need not be displayed to the user. Rather the processing may include merely providing confirmation information to the user that the merchant has been provided with the credentials to fulfill the requested transaction. For example, the bookmark processing portion might output the transaction data to the merchant system via a network connection apart from the merchant webpage.

With further reference to step 583—on the other hand, if NO in step 583, then the process passes to step 585. In step 585 of FIG. 9, the user transaction webpage is presented on the computer 200 of the user. Then, the process passes to step 586. In step 586, in accordance with one embodiment of the invention, the user is requested to enter a password to secure credentials for the transaction. It is appreciated that the particular nature of the password, for example how long a password, may be varied as desired. It is appreciated that any suitable processing may be utilized to verify that the user interfacing with the server 100 is indeed a legitimate user. In one embodiment, the server 100 may simply recognize the user's computer 200, and in such manner authenticate the user. After step 386, and process passes to step 587.

In step 587, once the password is entered and verified, credentials are presented to the user in the user transaction webpage. That is, in this example, the credentials for the transaction are visibly displayed to the user on the user's computer 200. Then, the process passes to step 588.

Step 588 reflects that the user can then take those credentials and enter the credentials into the merchant payment field (of the merchant webpage) and/or enter other information which was displayed on the user transaction webpage (generated by the server 100) into other fields of the merchant webpage. Such other information might include, in particular, an expiration date and/or a CVV code. Once all of the needed information for payment has been entered (by the user) into the merchant webpage, the user interfaces in some suitable manner so as to proceed with payment for the requested transaction. After step 580, the process passes to step 589.

In step 589, the merchant system displays a webpage to the user indicating that the transaction has been funded, i.e., the transaction is authorized and is complete. Then, the process passes to step 589'. In step 589' the processing returns to FIG. 7, and specifically to step 590.

Figure 10:
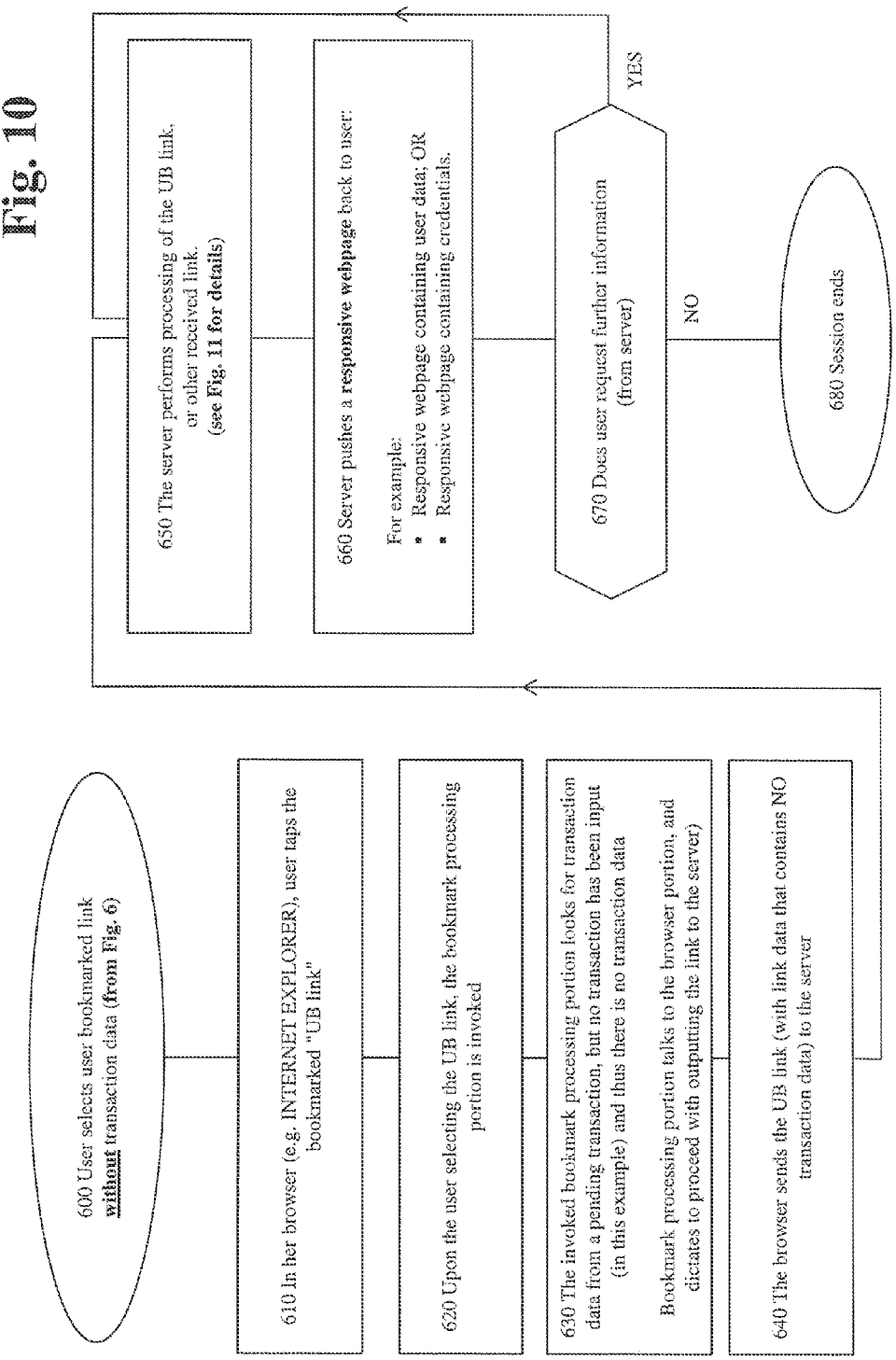
FIG. 10 is a flowchart showing further details of the "user selects user bookmarked link without transaction data" (step 600 of FIG. 6) in accordance with one embodiment of the invention.

FIG. 10 is a flowchart showing further details of the "user selects user bookmarked link without transaction data" (step 600 of FIG. 6) in accordance with one embodiment of the invention. Accordingly, the processing shown in FIG. 10 reflects a situation in which the user is not presently engaged in a transaction and, correspondingly, there is no transaction data.

As shown in FIG. 10, the processing starts in step 600 and passes to step 610. In step 610, the user opens up the computer browser application (on her computer) and navigates to select the payment bookmark. That is, the user selects the user bookmark (UB) link, which is associated with UB link data 250. Then, the processing passes to step 620.

In step 620, upon the user selecting the UB link, the bookmark processing portion 230 is invoked. The specific manner in which the bookmark processing portion 230 is invoked may vary. In accordance with one embodiment of the invention, attributes or data in the UB link (upon the user selecting the UB link) trigger the computer browser application to invoke the bookmark processing portion 230. Then, the process passes to step 630.

In step 630, the invoked bookmark processing portion looks for transaction data from a pending transaction. However, as noted above, in this particular example, there is no pending transaction and thus there is no transaction data. Accordingly, in step 630, the bookmark processing portion talks to the browser application, and indicates to proceed without putting the link to the server. Then, the process passes to step 640.

In step 640, the browser proceeds with sending the UB link (with link data 250 that contains no transaction data) to the server. Then, in step 650, the server performs processing of the UB link. Further details of such processing performed by the server are described below with reference to FIG. 11. After step 650, the process passes to step 660.

In FIG. 10, step 660 reflects processing in which the server 100 pushes a responsive webpage back to the user. As shown, such responsive webpage might contain user data, such as changing the preferences of a user and displaying those changed preferences to the user. Alternatively, such responsive webpage might contain credentials, which the user will then use in some transaction, as desired. Accordingly, the processing of step 650 in step 660 reflect that the server performs processing based on input data, and pushes a webpage to the user based on such processing.

With further reference to FIG. 10, after step 660, the processing then passes to step 670. In step 670, the server 100 performs a determination of whether the user has requested further information (from the server 100). If NO, then processing passes to step 680. In step 680, the processing ends, i.e., the session ends.

Figure 11:
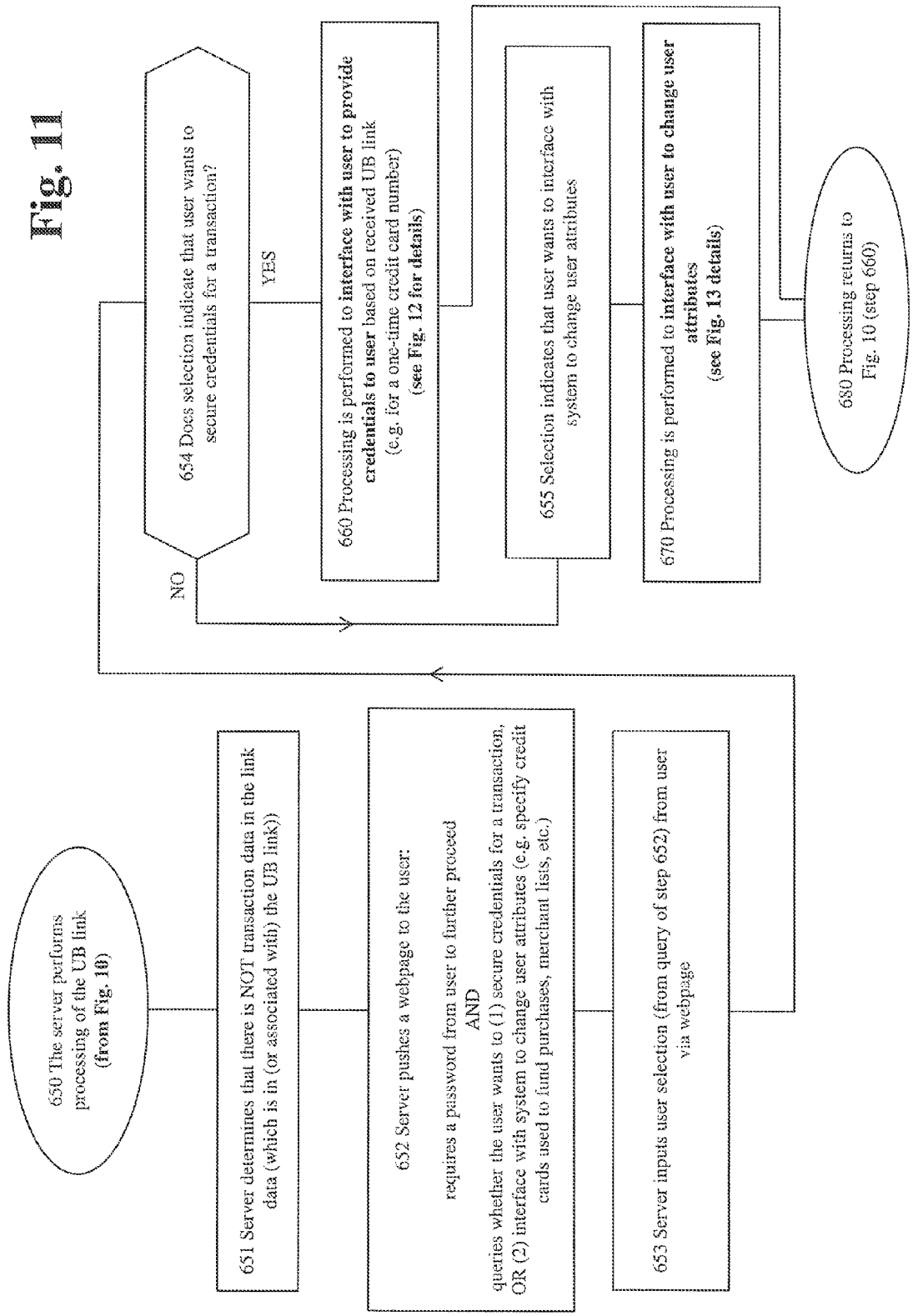
FIG. 11 is a flowchart showing further details of the "server performs processing of the UB link" (step 650 of FIG. 10) in accordance with one embodiment of the invention.

On the other hand, if YES in step 670, i.e. the user does request further information from the server, then the process returns to step 650. Processing them proceeds as described above—with the server responding to data it receives from the user via the web interface. FIG. 11 is a flowchart showing further details of the "server performs processing of the UB link" (step 650 of FIG. 10) in accordance with one embodiment of the invention. As shown, the processing starts in step 650 of FIG. 11 and passes to step 651. In step 651, the server determines that there is not transaction data in the link data 250, i.e. there is not transaction data in the link data 250 which is associated with the UB link received from the user. After step 651, the process passes to step 652.

In step 652, the server pushes a webpage to the user. In accordance with one embodiment of the invention, the webpage requires a password from the user to further proceed. In addition, either in that particular webpage or in a subsequent webpage, the server queries the user as to what she wishes to do. Specifically, for example, the server queries whether the user wants to (1) secure credentials for a transaction, or (2) interface with the system to change user attributes. For example, a change to user attributes might be in the form of specifying credit cards to use for funding purchases, merchant lists, and/or other preferences. After step 652, the process passes to step 653.

In step 653, the server inputs the user selection (from the query of step 652) from the user via the webpage interface.

That is, the server inputs whether the user wishes to (1) secure credentials for a transaction, OR (2) interface with system to change user attributes. After step 653, the process passes to step 654.

In step 654, the processing determines—does the selection indicate that the user wishes to secure credentials for the transaction? If YES, then the processing passes to step 660. In step 660, processing is performed to interface with the user to provide credentials to the user based on the received UB link. For example, the processing might be to provide the user with credentials in the form of a one-time credit card number. Further details of the processing of step 660 are described below with reference to FIG. 12.

On the other hand, if NO in step 654, then the processing passes to step 655. The processing of step 655 reflects that the user selection indicates the user wants to interface with the server to change user attributes. Accordingly, the processing passes to step 670.

In step 670, processing is performed to interface with the user to change the user attributes, as requested. Further details of the processing of step 670 are described below with reference to FIG. 13.

After either of step 660 of FIG. 11 or step 670 of FIG. 11, the processing passes to step 680. In step 680, the processing returns to FIG. 10, and specifically passes to step 660 of FIG. 10. As described above and reflected in FIG. 10, the processing then continues to interface with the user via webpage to satisfy any further user requests.

Figure 12:
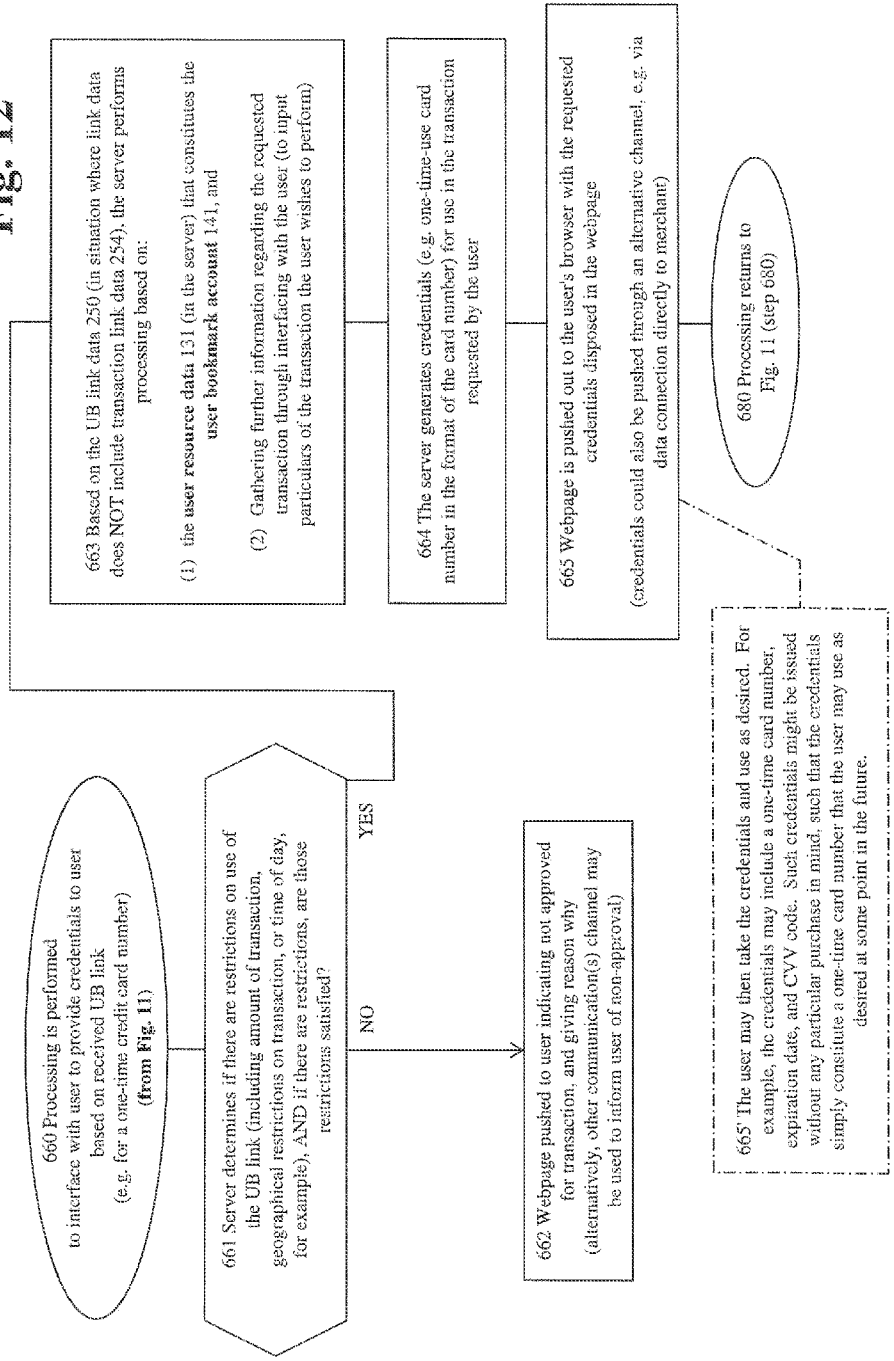
FIG. 12 is a flowchart showing further details of the "processing is performed to interface with user to provide credentials to user based on received UB link (step 660 of FIG. 11) in accordance with one embodiment of the invention.

FIG. 12 is a flowchart showing further details of the "processing is performed to interface with user to provide credentials to user based on received UB link (step 660 of FIG. 11) in accordance with one embodiment of the invention. As shown, processing starts in step 660 and passes to step 661. In step 661, decisioning is performed regarding whether the UB link may be used by the user. More specifically, the server determines if there are restrictions on use of the bookmark payment processing. Such restrictions might include the amount of the transaction, geographical restrictions on the transaction, the merchant or type of merchant and/or the time of day, for example. For example, restrictions might automatically have been imposed by the system (e.g. the server 100) and/or the user may have imposed restrictions on use of the UB link. Illustratively, the UB link may have restrictions including use only between 9 AM and 5 PM, for a transaction amount less than $100, and/or within a particular proximity of some predetermined place of business.

Furthermore, in the processing of step 661, if there are restrictions on the use of the UB link, then the server determines whether those restrictions are indeed satisfied by the particular transaction under consideration. If NO, in step 661, i.e., the restrictions are not satisfied, then the processing passes to step 662.

In step 662, in accordance with one embodiment of the invention, a webpage (or other communication) is pushed to the user indicating that he has not been approved for the transaction. Such communication may provide reasons why the transaction was not approved. In general, it is appreciated that any suitable channel of communication and type of communication may be utilized to advise user of the disposition of the transaction approval. Relatedly, the particular content of such communication may vary as desired.

On the other hand, if YES in step 661, i.e., the restrictions imposed on the requested transaction are satisfied, then the processing passes to step 663.

In step 663, the server 100 processes the UB link data, in this illustrative situation in which the UB link data does not include transaction data 254. More specifically, the server 100 processes the UB link data using (1) the user resource data 131 (in the server) that constitutes the user bookmark account 141, as well as (2) gathering further information regarding the requested transaction through interfacing with the user (to input particulars of the transaction the user wishes to perform). It is appreciated that other data may also be used to process the UB link data. For example, data might be pulled from the Internet relating to a particular merchant. After step 663, process passes to step 664.

In step 664, the server generates credentials based on the processing in step 663. Such credentials might be in the form of a one-time use card number in the format of a standard credit card number, for example. This one-time-use card number may then be used in a transaction by the user. After step 664, process passes to step 665.

In FIG. 12, in step 665, a webpage is pushed out to be user's browser with the requested credentials disposed in the webpage. The user may then use the credentials in some predetermined manner. Such predetermined manner might simply be general use with a merchant chosen by the user (i.e., the user). In accordance with one embodiment of the invention, use of the credentials might be more limited, such as use with a particular merchant. The use of the credentials may be subject to other constraint(s).

Accordingly, as set forth in box 665' of FIG. 12, the user made take the credentials and use the credentials as desired. For example, the credentials might include a one-time card number, in addition to an expiration date and CVV code. Such credentials might be issued without any particular purchase in mind, such that the credentials simply constitute a one-time card number the user may use as desired at some point in the future.

After the processing of step 665 in FIG. 12, process passes to step 680. In step 680, the processing returns to FIG. 11, and specifically passes to step 680 of FIG. 11.

Figure 13:
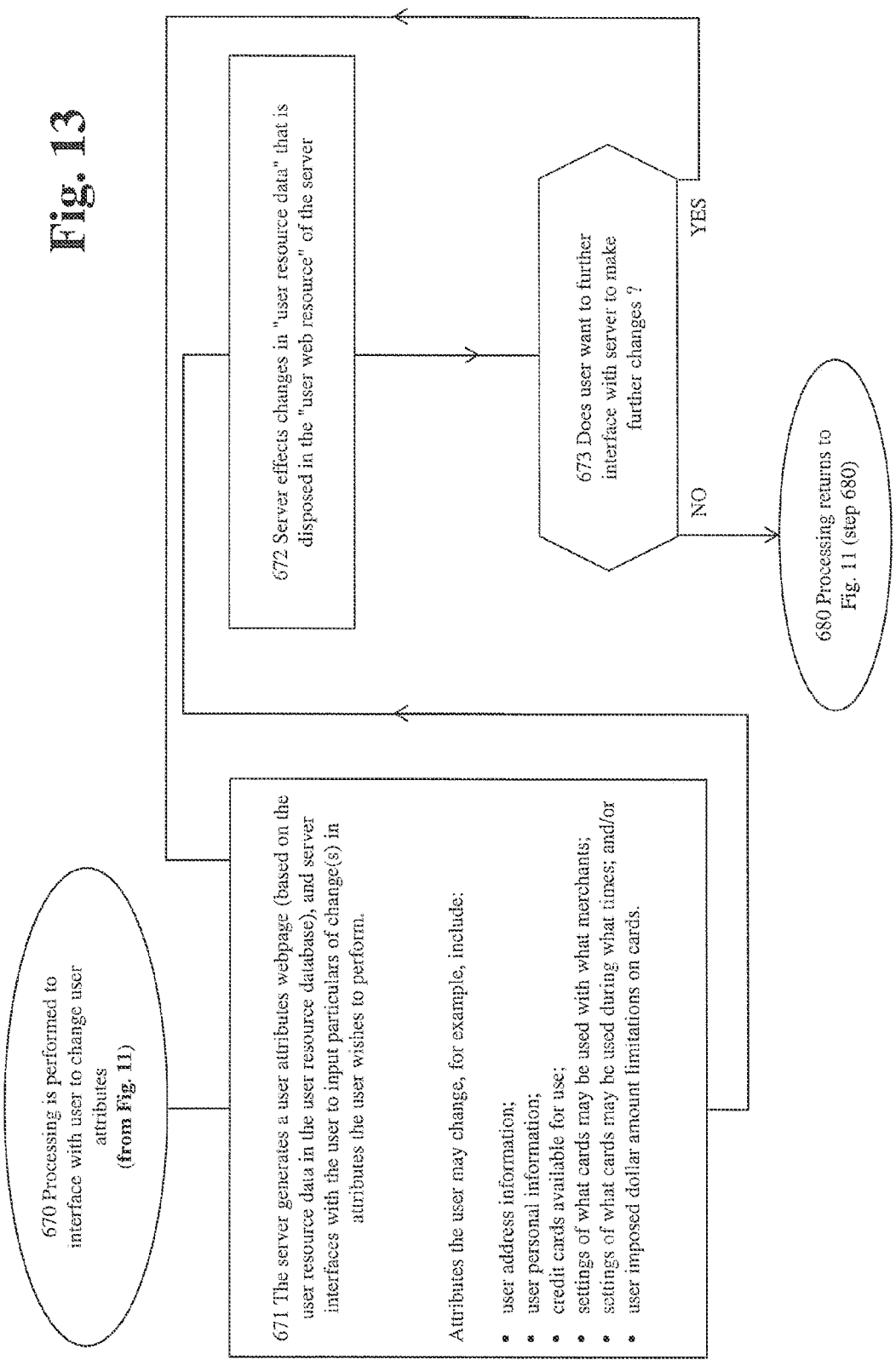
FIG. 13 is a flowchart showing further details of the "processing is performed to interface with user to change user attributes" (step 670 of FIG. 11) in accordance with one embodiment of the invention.

FIG. 13 is a flowchart showing further details of the "processing is performed to interface with user to change user attributes" (step 670 of FIG. 11) in accordance with one embodiment of the invention. Accordingly, FIG. 13 illustrates user attributes processing. The process starts in step 670, and passes to step 671.

In step 671, the server 100 generates a user attributes webpage, based on the user resource data 130' in the user resource database 130. For example, the server 100 interfaces with the user to input particulars of attributes the user wishes to change. It is appreciated that such interfacing with the user might be in the form of a single webpage or a series of webpages and/or be performed in conjunction with communication with the user over other communication channels. For example, attributes the user might change include user address information, other user personal information, credit cards available for use, settings of what cards may be used with what merchants, settings of what cards may be used during which times, user imposed dollar amount limitations on cards, and/or him user imposed dollar amount limitations on particular merchants. It is appreciated that various other user attributes might be adjusted as desired.

After step 671 of FIG. 13, the processing passes to step 672. In step 672, the server 100 effects changes based on the processing performed in step 671. Specifically, the server effects changes to the user resource data 130' that is disposed in the user resource database 130. After step 672, the process passes to step 673.

In step 673, a determination is made of whether the user wishes to further interface with the server 100 to make further changes to his or her user attributes. If YES, then the processing passes back to step 671. Processing is then continued as described above. On the other hand, if NO in the determination of step 673, i.e., the user does not want to make further changes, then the processing passes to step 680. In step 680, processing returns to FIG. 11, step 680.

FIG. 15 is a flowchart showing a series of steps (1501-1504) and associated GUIs (1501'-1504') showing aspects of bookmark payment processing in accordance with one embodiment of the invention.

As shown in FIG. 15, in step 1501, the user, i.e., user, browses a merchant site and decides to perform a transaction to purchase a particular item. In this embodiment, upon the merchant site prompting the user to "check out" the user navigates to her bookmarks and selects the "Chase pay" bookmark in step 1502. Alternatively, upon the user tapping the checkout button in the GUI 1501', the user might be automatically navigated to the GUI 1502'.

In step 1502, upon the user tapping her bookmark button and selecting "chase pay", the GUI 1503' is generated and displayed to the user. The user is prompted to enter a 4 digit PIN (personal identification number). It is of course appreciated that any authenticating credential might be entered, and the invention is not limited to such a 4 digit PIN. For example, biometrics, such as the user's fingerprint, might be utilized to authenticate the user/user. Upon the user entering their 4 digit PIN, such information is communicated back to the server in step 1503. Upon the PIN being verified by the server, a one-time user card number is generated and autofilled in step 1504. Accordingly, in some embodiments the one-time user card number might be automatically populated into a checkout GUI for the merchant. In other embodiments, the user might be required to enter the one-time user card number into the checkout GUI for the merchant. It is appreciated that a PIN, for example, is described herein as a credential utilized to authenticate the identity of the user. However, it is appreciated that other types of credentials may instead be utilized. A PIN is not limited to numerical characters, but may also use and include any other character as desired. For example a PIN may be in the form of and include letters, numbers, alphanumeric characters, glyphs, and/or any other character, for example.

As described above, the processing of FIG. 15 may include the creation of one-time user card number that the user can then use in a desired transaction. FIG. 16 is a diagram showing the multiple bank relationships can map to such a one-time use card number, in accordance with one embodiment of the invention. Accordingly, such a transaction might be funded in a variety of ways as desired by the user. As a result, the transaction using the one-time use card number might be funded by points, a debit card, a credit card, home equity, or maybe funded in any other manner as desired.

As described herein, the systems and methods of the invention are described in the context of a user computer in the form of a cell phone, personal computer, or other device, i.e., a processing machine. It is appreciated that processing described herein in the context of any particular user computer may be used in the context of another user computer as desired, such devices including, for example, a cell phone, smartphone, personal computer, personal digital assistant (PDA) tablet computer, iPad, notebook, and/or any other suitable device.

In bookmark processing as described herein, a user interfaces with a merchant, so as to perform an online purchase, for example. As described herein, at a point in the transaction to purchase the item or service, for example, bookmark processing is invoked. The bookmark processing includes the user device interfacing with the merchant system and interfacing with the financial entity's system that maintains the bookmark processing, such as the server 100 (maintained by a financial entity 100') of FIG. 1. In accordance with one embodiment of the invention, upon the transaction being authorized by the server 100, the transaction is then submitted for processing over a payment network. The particular payment network over which the transaction is processed will depend on the particular payment mechanism used to perform the transaction, such as the particular credit card used to perform the transaction.

It is appreciated that the systems and methods of the invention are adaptable to a wide variety of network arrangements. Illustratively, there may be a number of financial entities in a typical credit card processing system, or other payment processing system. These "components" may include a credit card issuing bank or other financial entity that issued the credit card or other payment mechanism, the merchant system, the merchant bank, and an acquiring financial entity (such as an acquiring bank), and of course the customer (user). Further, the credit card processing system includes a network by which the financial entities processing a transaction communicate. For example, the transaction might utilize the payment network maintained by VISA or MasterCard.

Each component of a payment processing system may be maintained by distinct financial entities, such as by different and respective banks, for example. However, in other arrangements, each component of a payment processing system might be maintained by the same financial entity. As such relates to the bookmark processing described herein, it should be appreciated that the processing of the invention may include interface with any of the components of the payment processing system. Such interaction may be enhanced if each component of the payment processing system are indeed maintained by a single financial entity (such as by single bank) or affiliated financial entities. In conjunction with a transaction, the interaction with the various financial components involved in such transaction may vary as desired. For example, the interaction may include communications, alerts, and/or notices between any of the components. The interaction may also include the utilization of trigger mechanisms or thresholds. Such trigger mechanisms or thresholds might relate to assessing the risk of processing a particular transaction, whether an available balance is sufficient to cover a requested transaction, to perform an assessment of fraud, to assess the cost of processing a transaction (either from the perspective of a financial entity (bank) or from the perspective of a user (customer)), the earn or burn of rewards points associated with particular transaction, or the earn or burn of some other loyalty system associated with a transaction, for example. The interaction may also include the utilization of various business analytics, value added services, and/or volume discounts, for example. For example, a merchant who is associated with multiple components of a payment system, as those components are described above for example, may receive a discount in processing transactions since the financial entity collectively maintain such components do not have to experience transaction costs associated with passing funds to another financial entity. In addition, a merchant may be extended cost savings in a situation where they maintain funds within the payment processing system for a predetermined period of time. That is, if the merchant, for example, maintains funds in particular components of the payment processing system that are maintained by a single financial entity.

Relatedly, it is appreciated that in a system where all the components are maintained by a single financial entity, the bookmark processing described herein may utilize different approaches and/or arrangements in processing a transaction, as compared to known processing arrangements. In particular, in a system where all the components are maintained by a single financial entity, the components described above may be integrated in some manner. For example, processing is typically done by a credit card issuing bank might instead be done by an acquiring bank or vice versa. That is, such different processing may be performed since the credit card issuing bank and the acquiring bank are indeed the same financial entity.

In accordance with embodiments of the invention, various aspects of bookmark processing may relates to the particular geographical location (geolocation) in which a user is disposed. In particular, a user's geolocation might be determined by his or her smart phone, and that determined location utilized in conjunction with processing a transaction and performing bookmark processing associated with the transaction. In particular, it is described herein that bookmark processing might be limited to a particular location. However, the use of geographical location is now limited to such processing. For example, the geolocation of a user may be utilized to advise a user of a particular merchant in proximity to the user. Upon the determination of a merchant in proximity to the user, data used in the bookmark processing might be populated based on the particulars of such merchant. For example, a user might be advised that she is in proximity to a particular STARBUCKS store. In conjunction with interface with the user, the bookmark processing, may be performed by the computer processing portion 210 for example, to utilize data regarding the particular STARBUCKS store, e.g. in populating data fields used to perform such bookmark processing. In particular, with reference to FIG. 1, data retrieved regarding a proximate merchant (such as the proximate STARBUCKS store in this example) might be utilized to populate the transaction link data 254.

It is appreciated that the data used in bookmark processing, relating to a proximate merchant, may be retrieved at different points in the transaction in accordance with different embodiments of the invention. For example, a user might initiate the retrieval of such data regarding a proximate merchant before initiating a transaction or in conjunction with performing a transaction. On the other hand, the user might not initiate the retrieval of such data. Rather, upon the user performing a transaction with a merchant, the bookmark processing automatically looks for available data based on the proximity of the merchant.

It is appreciated that a user may have multiple bookmarks, on a user device, associated with a single financial entity, such as with a single bank. It is appreciated that there may be various reasons that multiple bookmarks may be desirable to a particular user. Attributes between the respective bookmarks may be varied as desired. For example, one bookmark on a user device may be for a first merchant, and a second bookmark on the user device for use with a second merchant. An advantage of providing different bookmarks for different situations, such as for two different merchants, is that preferences between the different bookmarks may be set differently by the user and/or by the particular financial entity (or other attributes of the two respective bookmarks might be set differently). For example, a transaction limit on a first bookmark associated with a first merchant might be set at a lower value versus a transaction limit on a second bookmark associated with a second merchant. In other embodiments, the bookmark processing may include the ability for the user to set different preferences (or other attributes) within a single bookmark. For example, the bookmark processing may include the ability to identify which merchant is involved in a transaction, and retrieve preferences or other attributes associated with that particular merchant. Hand-in-hand, with such same bookmark, if another different merchant is involved in a further transaction, then other preferences or other attributes would be utilized in performing the transaction.

Hereinafter further aspects of implementation will be described.

As described above, embodiments of the system of the invention and various processes of embodiments are described. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system described above, executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, RUM Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A system that performs transaction processing using a payment bookmark that is associated with a user bookmarked link, the system comprising:
   at least one computer processor; and
   memory having instructions stored thereon, the instructions, when executed by the at least one processor, cause the at least one processor to perform operations, the operations comprising:
   receiving a selection of a payment bookmark from a user, and upon selection of the payment bookmark, the computer processor invoking a bookmark processing application;
   the payment bookmark mapped to the user bookmarked link (UB link) that is stored in the memory, wherein the UB link includes UB link data, and wherein the UB link data includes core link data;
   the bookmark processing application causes the at least one processor to:
   identify available transaction data from a merchant website;
   retrieve available transaction data from the merchant webpage based on a set of rules, and wherein the retrieved available transaction data includes transaction link data;
   append any retrieved transaction link data to the core link data of the UB link data based on the set of rules, such that:
   the UB link data includes core link data and transaction link data, when the transaction data was available to retrieve;
   the UB link data includes core link data without transaction link data, when transaction link data was not available to retrieve; and
   output the UB link with the UB link data to a server over a network, wherein the server performs processing of the UB link and pushes a user transaction webpage back to the user.

2. The system of claim 1, the bookmark processing instructions cause the at least one processor to identify that there is available transaction data, such that transaction data is appended to the UB link.

3. The system of claim 2, the bookmark processing instructions cause the at least one processor to retrieve the available transaction data from the merchant webpage displayed on a user interface of the system.

4. The system of claim 3, the retrieving the available transaction data is performed automatically, without user input, upon the user selecting the UB link.

5. The system of claim 3, the retrieving the available transaction data is performed by interfacing with a user to receive, from the user, at least a portion of the available transaction data.

6. The system of claim 1, the available transaction data constituted by merchant related data and transaction amount data.

7. The system of claim 1, the UB link in the form of a uniform resource locator (URL).

8. The system of claim 1, wherein the bookmark application is disposed (1) in part on a computer readable medium of the system and (2) in part in a cloud computing environment.

9. The system of claim 1, the bookmark processing application is disposed on a computer readable medium of the system.

10. The system of claim 1, the network constituted by the Internet.

11. The system of claim 1, the network constituted by an Intranet.

12. The system of claim 1, wherein the system is disposed in one of a cell phone, smartphone, personal computer, personal digital assistant (PDA), tablet computer, iPad, and notebook computer.

13. The system of claim 1, wherein the retrieving available transaction data includes retrieving data from a merchant in geographical proximity to a user computer.

14. The system of claim 1, wherein the memory includes a plurality of payment bookmarks associated with a user computer.

15. The system of claim 14, the plurality of payment bookmarks, associated with the user computer, being different in regards to preferences associated with each respective bookmark.

16. The system of claim 15, the plurality of payment bookmarks including a first bookmark associated with a first merchant and a second bookmark associated with a second merchant.

17. The system of claim 15, the plurality of payment bookmarks including a first bookmark associated with a first transaction limit and a second bookmark associated with a second transaction limit.

18. A computer-implemented method to perform transaction processing using a payment bookmark that is associated with a user bookmarked link, the method performed by one or more data processing apparatus, the method comprising:
   receiving selection of a payment bookmark from a user, and upon selection of the payment bookmark, the one or more data processing apparatus invoking a bookmark processing application stored in a memory;
   the payment bookmark mapped to the user bookmarked link (UB link) that is stored in the memory, wherein the UB link includes UB link data, and wherein the UB link data includes core link data;
   identifying available transaction data from a merchant webpage;

retrieving, by the one or more data processing apparatus, available transaction data from the merchant webpage performed based on a set of rules, and wherein the retrieved available transaction data includes transaction link data;

appending, by the one or more data processing apparatus, any retrieved transaction link data to the core link data of the UB link data based on the set of rules, such that:

the UB link data includes core link data and transaction link data, when the transaction data was available to retrieve;

the UB link data includes core link data without transaction link data, when transaction link data was not available to retrieve; and outputting, by the one or more data processing apparatus, the UB link with the UB link data to a server over a network, wherein the server performs processing of the UB link and pushes a user transaction webpage back to the user.

19. A non-transitory computer readable medium having instructions stored thereon, the instructions, when executed by one or more processors, cause the processors to perform transaction processing using a payment bookmark that is associated with a user bookmarked link, the instructions further causing the one or more processors to:

receive selection of a payment bookmark from a user, and upon selection of the payment bookmark, invoke a bookmark processing application;

the payment bookmark mapped to the user bookmarked link (UB link) that is stored in memory, wherein the UB link includes UB link data, and wherein the UB link data includes core link data;

identify available transaction data from a merchant webpage;

retrieve, by the one or more processors, available transaction data from the merchant webpage to performed based on a set of rules, and wherein the retrieved available transaction data includes transaction link data;

append, by the one or more processors, any retrieved transaction link data to the core link data of the UB link data based on the set of rules, such that:

the UB link data includes core link data and transaction link data, when the transaction data was available to retrieve;

the UB link data includes core link data without transaction link data, when transaction link data was not available to retrieve; and output, by the one or more processors, the UB link with the UB link data to a server over a network, wherein the server performs processing of the UB link and pushes a user transaction webpage back to the user.

\* \* \* \* \*